(12) United States Patent
Kami

(10) Patent No.: US 10,427,497 B2
(45) Date of Patent: Oct. 1, 2019

(54) AIR CONDITIONER FOR VEHICLE

(71) Applicant: DENSO CORPORATION, Kariya, Aichi-pref. (JP)

(72) Inventor: Yuuichi Kami, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/576,308

(22) PCT Filed: May 23, 2016

(86) PCT No.: PCT/JP2016/065150
§ 371 (c)(1),
(2) Date: Nov. 22, 2017

(87) PCT Pub. No.: WO2016/203903
PCT Pub. Date: Dec. 22, 2016

(65) Prior Publication Data
US 2018/0141410 A1 May 24, 2018

(30) Foreign Application Priority Data

Jun. 16, 2015 (JP) .................................. 2015-121102

(51) Int. Cl.
*B60H 1/22* (2006.01)
*B60H 1/00* (2006.01)
*B60H 1/18* (2006.01)

(52) U.S. Cl.
CPC ........... *B60H 1/22* (2013.01); *B60H 1/00335* (2013.01); *B60H 1/00878* (2013.01);
(Continued)

(58) Field of Classification Search
CPC ............ B60H 1/00335; B60H 1/00878; B60H 1/00921; B60H 1/18; B60H 1/22; B60H 2001/225
See application file for complete search history.

(56) References Cited

U.S. PATENT DOCUMENTS

| | | | |
|---|---|---|---|
| 5,497,941 A | 3/1996 | Numazawa et al. | |
| 2005/0028547 A1* | 2/2005 | Hatakeyama | B60H 1/00921 62/324.1 |
| 2012/0255319 A1 | 10/2012 | Itoh et al. | |
| 2013/0055751 A1* | 3/2013 | Inaba | B60H 1/2218 62/498 |

(Continued)

FOREIGN PATENT DOCUMENTS

| | | |
|---|---|---|
| JP | H05221233 A | 8/1993 |
| JP | 2012225637 A | 11/2012 |
| JP | 2013052877 A | 3/2013 |

*Primary Examiner* — Marc E Norman
(74) *Attorney, Agent, or Firm* — Harness, Dickey & Pierce, P.L.C.

(57) ABSTRACT

A vehicle air conditioner includes an air-heating switching portion that switches between a first air-heating mode of heating ventilation air by a heating heat exchanger and a second air-heating mode of heating the ventilation air by a condenser. The vehicle air conditioner includes a heat-exchange adjustment portion that adjusts an amount of heat exchange between the high-pressure refrigerant and the ventilation air in the condenser, and a heat-exchange control unit that controls the heat-exchange adjustment portion. The heat-exchange control unit controls the heat-exchange adjustment portion to decrease the amount of heat exchange between the high-pressure refrigerant and the ventilation air in the condenser if a condition satisfies in which temperature of the refrigerant in the condenser is equal to or lower than temperature of the ventilation air heated by a heating heat exchanger before passing through the condenser, when the air-heating switching portion switches from the first air-heating mode to the second air-heating mode.

9 Claims, 21 Drawing Sheets

(52) U.S. Cl.
CPC ........... *B60H 1/00921* (2013.01); *B60H 1/18* (2013.01); *B60H 2001/225* (2013.01)

(56) References Cited

U.S. PATENT DOCUMENTS

| | | | |
|---|---|---|---|
| 2015/0159933 A1 | 6/2015 | Itoh et al. | |
| 2015/0260439 A1* | 9/2015 | Ohta | F25B 5/00 |
| | | | 62/196.1 |
| 2015/0292780 A1* | 10/2015 | Kitamura | F25B 13/00 |
| | | | 62/324.1 |

* cited by examiner

FIG. 4
| | AIR-COOLING MODE | DEHUMIDIFICATION HEATING MODE | AIR-HEATING MODE |
|---|---|---|---|
| LOW-PRESSURE SIDE ON-OFF VALVE | CLOSED STATE | CLOSED STATE | OPEN STATE |
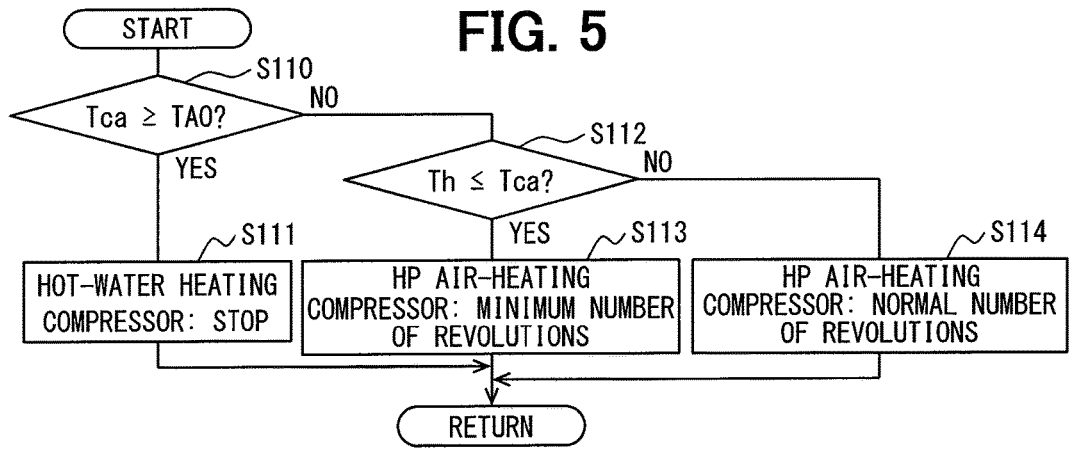
FIG. 5
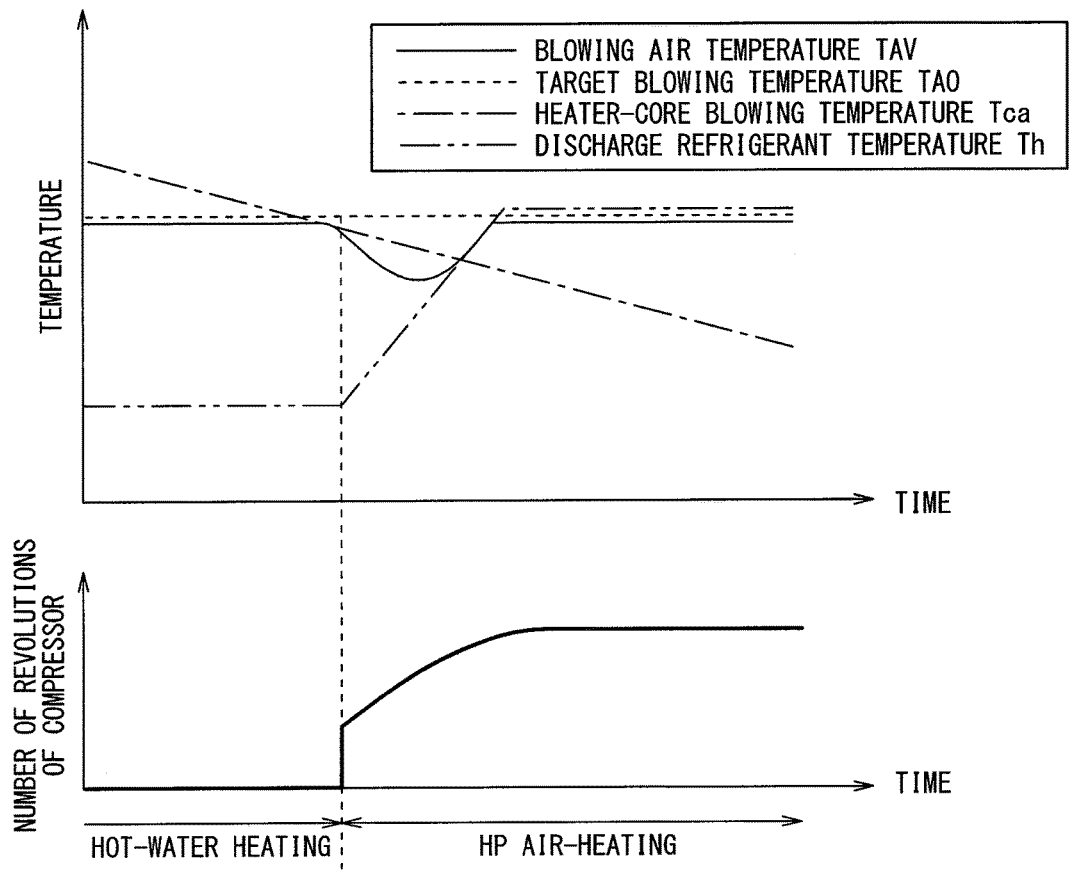
FIG. 6

|  | AIR-COOLING MODE | DEHUMIDIFICATION HEATING MODE | AIR-HEATING MODE |
|---|---|---|---|
| FIRST EXPANSION VALVE | FULLY OPEN STATE | FULLY OPEN STATE | THROTTLE STATE |
| SECOND EXPANSION VALVE | THROTTLE STATE | THROTTLE STATE | COMPLETELY CLOSED STATE |

AIR CONDITIONER FOR VEHICLE

CROSS REFERENCE TO RELATED APPLICATIONS

This application is a U.S. National Phase Application under 35 U.S.C. 371 of International Application No. PCT/JP2016/065150 filed on May 23, 2016 and published in Japanese as WO 2016/203903 A1 on Dec. 22, 2016. This application is based on and claims the benefit of priority from Japanese Patent Application No. 2015-121102 filed on Jun. 16, 2015. The entire disclosures of all of the above applications are incorporated herein by reference.

FIELD OF THE INVENTION

The present disclosure relates to an air conditioner for a vehicle, capable of performing air-heating of a vehicle interior.

BACKGROUND ART

Conventionally, a vehicle air conditioner is known to be capable of switching between air-heating of a vehicle interior using a high-pressure refrigerant in a vapor compression refrigeration cycle and air-heating of the vehicle interior using a heat source other than the refrigeration cycle (for example, exhaust heat from an internal combustion engine) (see, for example, Patent Document 1).

The vehicle air conditioner described in Patent Document 1 is designed to switch between the air-heating of the vehicle interior using a coolant in the internal combustion engine when the coolant is at a high temperature and the air-heating of the vehicle interior using the high-pressure refrigerant in the refrigeration cycle when the coolant is at a low temperature. In the technique described in Patent Document 1, a heater core that dissipates heat from the coolant into ventilation air to be blown into the vehicle interior is disposed on an upstream side of an air flow with respect to a condenser that dissipates heat from the high-pressure refrigerant into the ventilation air.

Patent Document 1: Japanese Unexamined Patent Application Publication No. 05-221233

SUMMARY OF THE INVENTION

The temperature of air to be blown into the vehicle interior is occasionally decreased when switching from the interior air-heating using the heat source other than the refrigeration cycle to the interior air-heating using the high-pressure refrigerant in the refrigeration cycle.

With regard to this matter, the inventors have diligently studied. As a result, it is found that immediately after start-up of the refrigeration cycle, the temperature of the refrigerant flowing through the condenser sometimes becomes lower than that of the ventilation air having passed through the heater core. Because of this, the refrigerant flowing through the condenser absorbs heat from the ventilation air.

It is an object of the present disclosure to provide an air conditioner for a vehicle, which can suppress a decrease in the temperature of air to be blown into a space to be air-conditioned when switching from air-heating using a heat source, other than a refrigeration cycle, to air-heating using a high-pressure refrigerant in the refrigeration cycle.

According to an aspect of the present disclosure includes, an air conditioner for a vehicle includes:

a vapor compression refrigeration cycle including a compressor that compresses and discharges a refrigerant, and a condenser that exchanges heat between the high-pressure refrigerant discharged from the compressor and ventilation air to be blown into a space to be air-conditioned;

a heating heat exchanger that heats the ventilation air before passing through the condenser, by using a heat source other than the refrigeration cycle;

an air-heating switching portion that switches between a first air-heating mode of stopping an operation of the compressor and heating the ventilation air by the heating heat exchanger and a second air-heating mode of operating the compressor and heating the ventilation air by at least the condenser;

a heat-exchange adjustment portion that adjusts an amount of heat exchange between the high-pressure refrigerant and the ventilation air in the condenser; and a heat-exchange control unit that controls the heat-exchange adjustment portion.

In the air conditioner for a vehicle, when the air-heating switching portion switches from the first air-heating mode to the second air-heating mode, the heat-exchange control unit controls the heat-exchange adjustment portion to decrease the amount of heat exchange between the high-pressure refrigerant and the ventilation air in the condenser if a condition satisfies in which temperature of the refrigerant in the condenser is equal to or lower than a temperature of the ventilation air heated by the heating heat exchanger before passing through the condenser, as compared to a case where the temperature of the refrigerant in the condenser exceeds the temperature of the ventilation air heated by the heating heat exchanger before passing through the condenser.

In this way, the amount of heat exchange between the high-pressure refrigerant and the ventilation air is decreased when the condition satisfies in which the refrigerant temperature in the condenser is equal to or lower than the temperature of the ventilation air heated by the heating heat exchanger. Consequently, the absorption of heat by the high-pressure refrigerant from the ventilation air can be suppressed. Thus, a decrease in the temperature of air to be blown into the space to be air-conditioned can be suppressed when switching from air-heating using a heat source, other than the refrigeration cycle, to air-heating using the high-pressure refrigerant in the refrigeration cycle. As a result, the comfort for users who use the vehicle air conditioner can be ensured.

According to another aspect of the present disclosure, an air conditioner for a vehicle includes:

a heating heat exchanger that exchanges heat between ventilation air to be blown into a space to be air-conditioned and a heating medium, to heat the ventilation air;

a vapor compression refrigeration cycle including a compressor that compresses and discharges a refrigerant, and a condenser that exchanges heat between the high-pressure refrigerant discharged from the compressor and the heating medium before flowing into the heating heat exchanger;

an air-heating switching portion that switches between a first air-heating mode of stopping the compressor and heating the heating medium before flowing into the condenser, by using a heating source other than the refrigeration cycle, and a second air-heating mode of operating the compressor and heating the heating medium by at least the condenser;

a heat-exchange adjustment portion that adjusts an amount of heat exchange between the high-pressure refrigerant and the heating medium in the condenser; and a heat-exchange control unit that controls the heat-exchange adjustment portion.

In the air conditioner, when the air-heating switching portion switches from the first air-heating mode to the second air-heating mode, the heat-exchange control unit controls the heat-exchange adjustment portion to decrease the amount of heat exchange between the high-pressure refrigerant and the heating medium in the condenser if a condition satisfies in which the temperature of the refrigerant in the condenser is equal to or lower than the temperature of the heating medium heated by the heating source and before flowing into the condenser, as compared to a case where a temperature of the refrigerant in the condenser exceeds a temperature of the heating medium heated by the heating source before flowing into the condenser.

In this way, the amount of heat exchange between the high-pressure refrigerant and the heating medium is decreased when the condition satisfies in which the refrigerant temperature in the condenser is equal to or lower than the temperature of the heating medium flowing into the condenser. Consequently, the absorption of heat by the high-pressure refrigerant from the heating medium can be suppressed. Thus, a decrease in the temperature of air to be blown into the space to be air-conditioned can be suppressed when switching from air-heating using a heat source, other than the refrigeration cycle, to air-heating using the high-pressure refrigerant in the refrigeration cycle. As a result, the comfort for users who use the vehicle air conditioner can be ensured.

BRIEF DESCRIPTION OF DRAWINGS

FIG. 4 is a table showing an open/closed state of a low-pressure side on-off valve in respective operation modes of the vehicle air conditioner according to the first embodiment.

FIG. 5 is a flowchart showing control processing in an air-heating mode, executed by the air-conditioning controller according to the first embodiment.

FIG. 6 is a graph showing a change in the blown air temperature when switching from hot-water heating to an HP air-heating.

DESCRIPTION OF EMBODIMENTS

Figure 1:
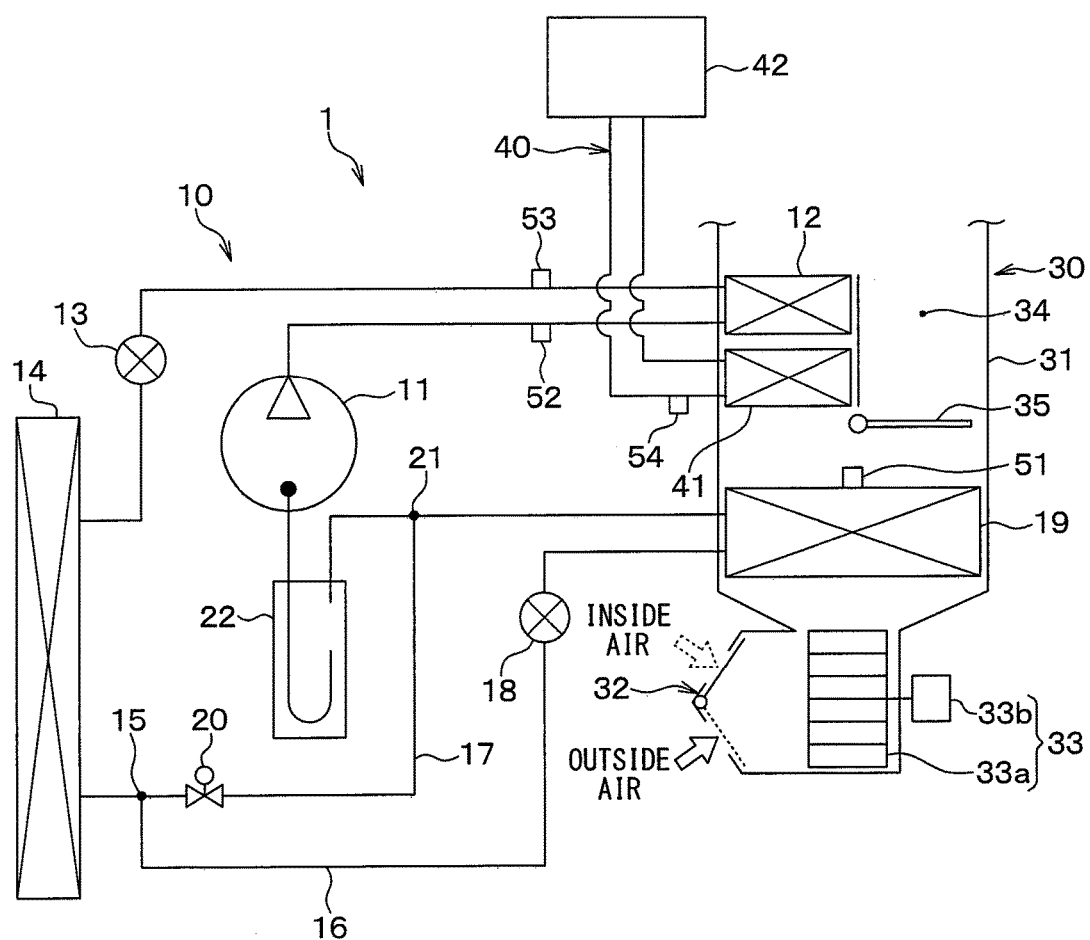
FIG. 1 is a schematic configuration diagram of a vehicle air conditioner according to a first embodiment.

Embodiments of the present disclosure will be described below with reference to the accompanying drawings. In the following respective embodiments, the same or equivalent parts as the matters explained in the previous embodiment(s) are denoted by the same reference numerals, and the description thereof will be omitted in some cases.

When only a part of a component in each of the embodiments is explained, other parts of the component can be applied to components explained in the previous embodiment(s).

The following embodiments can be partially combined to each other, especially when the combination does not cause any problem, unless otherwise specified.

First Embodiment

This embodiment will be described with reference to FIGS. 1 to 10. In the description of this embodiment, a vehicle air conditioner 1 of the present disclosure is used in a hybrid vehicle that can obtain the vehicle-traveling driving force from both an internal combustion engine (for example, engine) 42 and a traveling electric motor (not shown) by way of example.

The vehicle air conditioner 1 of this embodiment can be switched to an air-cooling mode of performing air-cooling of a vehicle interior as a space to be air-conditioned, a dehumidification heating mode of performing air-heating while dehumidifying the vehicle interior, or an air-heating mode of performing air-heating of the vehicle interior.

The vehicle air conditioner 1 in this embodiment is capable of switching between hot-water heating and heat-pump heating in the air-heating mode. The hot-water heating is the air-heating mode in which the internal combustion engine 42 as a heating source is used to heat the ventilation air to be blown into the vehicle interior. The heat-pump heating is the air-heating mode in which an interior condenser 12 in a heat pump cycle 10 to be described later is used to heat the ventilation air. In this embodiment, the hot-water heating configures a first air-heating mode, while the heat-pump heating configures a second air-heating mode. For convenience of explanation, the heat-pump heating will be sometimes referred hereinafter to as an "HP air-heating".

As shown in FIG. 1, the vehicle air conditioner 1 in this embodiment includes the heat pump cycle 10 and an interior air-conditioning unit 30 as main components.

The heat pump cycle 10 is configured of a vapor compression refrigeration cycle that includes a compressor 11, the interior condenser 12, a first expansion valve 13, an exterior heat exchanger 14, a second expansion valve 18, an interior evaporator 19, and an accumulator 22.

The heat pump cycle 10 in this embodiment forms a vapor compression subcritical refrigeration cycle in which a high-pressure side refrigerant pressure in the cycle does not exceed the critical pressure of the refrigerant, using a hydrofluorocarbon (HFC)-based refrigerant (e.g., R134a) as the refrigerant. Obviously, a hydrofluoroolefin (HFO)-based refrigerant (e.g., R1234yf) or the like may be adopted as the refrigerant.

The refrigerant in the heat pump cycle 10 contains a refrigerant oil mixed therein as a lubricating oil for lubricating respective components inside the compressor 11. Part of the lubricating oil circulates through the cycle with the refrigerant.

The compressor 11 as the component of the heat-pump cycle 10 is disposed in an engine room of the vehicle. The compressor 11 serves to compress and discharge the drawn refrigerant in the heat pump cycle 10.

The compressor 11 is configured of an electric compressor that has a compression mechanism (not shown) driven by an electric motor (not shown). The compression mechanism suitable for use can include various types of compression mechanisms, such as a scroll compression mechanism and a vane compression mechanism. The electric motor is an AC motor that has its operation controlled by AC current output from an inverter 80.

Figure 2:
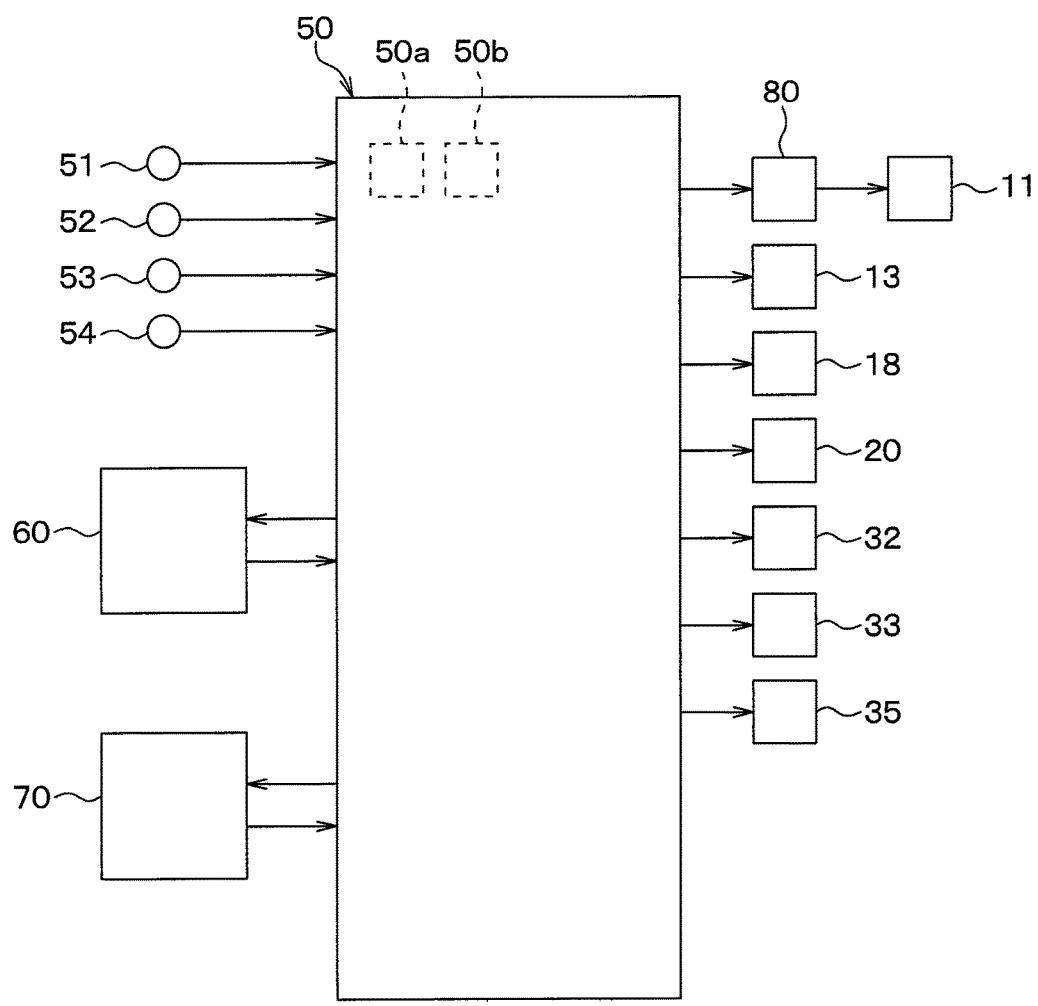
FIG. 2 is a block diagram of an air-conditioning controller of the vehicle air conditioner according to the first embodiment.

As shown in FIG. 2, the compressor 11 in this embodiment is connected to an air-conditioning controller 50 via the inverter 80. The inverter 80 is a device that controls the compressor 11 in accordance with a control signal output from the air-conditioning controller 50. The inverter 80 is configured to control the compressor 11 to enable adjustment of the flow rate of a high-pressure refrigerant flowing into the interior condenser 12. The inverter 80 changes the flow rate of the high-pressure refrigerant flowing into the interior condenser 12, thereby making it possible to adjust the amount of heat exchange between the high-pressure refrigerant and the ventilation air in the interior condenser 12. Therefore, in this embodiment, the inverter 80 configures a refrigerant flow-rate adjustment portion that adjusts the flow rate of the high-pressure refrigerant flowing into the interior condenser 12 and thereby as a heat-exchange adjustment portion.

Returning to FIG. 1, the interior condenser 12 is connected to the side of the refrigerant discharge port of the compressor 11. The interior condenser 12 is disposed in an air-conditioning case 31 of the interior air-conditioning unit 30 to be described later. The interior condenser 12 is a condenser that exchanges heat between the high-pressure refrigerant discharged from the compressor 11 and ventilation air passing through the interior evaporator 19, thereby heating the ventilation air.

The first expansion valve 13 is connected to the refrigerant outlet side of the interior condenser 12. The first expansion valve 13 is a decompression mechanism that decompresses the refrigerant flowing out of the interior condenser 12. The first expansion valve 13 includes a valve body that has its variable throttle opening degree and an actuator that drives the valve body.

The first expansion valve 13 in this embodiment is configured of a variable throttle mechanism that can be set at either of a throttle state of exhibiting the decompression function and a fully open state of not exhibiting the decompression function. The first expansion valve 13 is configured of an electric variable throttle mechanism that is controlled by a control signal output from the air-conditioning controller 50.

The exterior heat exchanger 14 is connected to the refrigerant outlet side of the first expansion valve 13. The exterior heat exchanger 14 is a heat exchanger that is disposed in the engine room and exchanges heat between the refrigerant having passed through the first expansion valve 13 and air outside a vehicle compartment (i.e., outside air).

The exterior heat exchanger 14 serves as a heat-absorption heat exchanger that exhibits a heat absorption function by evaporating a low-pressure refrigerant in the air-heating mode. Further, the exterior heat exchanger 14 serves as a heat-dissipation heat exchanger that dissipates heat from the high-pressure refrigerant in at least the air-cooling mode.

The refrigerant outlet side of the exterior heat exchanger 14 is connected to a low-pressure side branch portion 15 that branches the flow of refrigerant flowing out of the exterior heat exchanger 14. The low-pressure side branch portion 15 is configured of a three-way joint with three inflow/outflow ports, one of which serves as a refrigerant inflow port, and the remaining two of which serve as refrigerant outflow ports.

In the low-pressure side branch portion 15, one refrigerant outflow port is connected to a low-pressure refrigerant passage 16, and the other refrigerant outflow port is connected to a low-pressure bypass passage 17. The low-pressure refrigerant passage 16 is a refrigerant passage that guides the refrigerant to the accumulator 22, to be described later, via the second expansion valve 18 and the interior evaporator 19.

The second expansion valve 18 is a decompression mechanism that decompresses the refrigerant flowing out of the exterior heat exchanger 14. The second expansion valve 18 in this embodiment is configured of a variable throttle mechanism that can be set at either of a throttle state of exhibiting the decompression function and a completely closed state of interrupting the flow of the refrigerant. The second expansion valve 18 is configured of an electric variable throttle mechanism that is controlled by a control signal output from the air-conditioning controller 50 in the same manner as the first expansion valve 13.

The interior evaporator 19 is disposed on the upstream side of the air flow with respect to the interior condenser 12 within the air-conditioning case 31 of the interior air-conditioning unit 30 to be described later. The interior evaporator 19 is an evaporator that cools ventilation air, provided before passing through the interior condenser 12, by exchanging heat between the ventilation air and the low-pressure refrigerant having passed through the second expansion valve 18 to thereby evaporate the low-pressure refrigerant.

The low-pressure bypass passage 17 is a refrigerant passage that guides the refrigerant to the accumulator 22, to be described later, while bypassing the second expansion valve 18 and the interior evaporator 19. The low-pressure bypass passage 17 is provided with a low-pressure side on-off valve 20 that opens and closes the low-pressure bypass passage 17.

The refrigerant flowing out of the exterior heat exchanger 14 flows into the low-pressure bypass passage 17 when the low-pressure side on-off valve 20 is open, and the second expansion valve 18 is in a completely closed state. The refrigerant flowing out of the exterior heat exchanger 14 flows into the low-pressure refrigerant passage 16 when the low-pressure side on-off valve 20 is closed, and the second expansion valve 18 is in a throttled state. Therefore, in this embodiment, the low-pressure side on-off valve 20 and the second expansion valve 18 serve as a passage switching portion that switches the refrigerant passage for the refrigerant flowing out of the exterior heat exchanger 14 to either the low-pressure refrigerant passage 16 or the low-pressure bypass passage 17. The low-pressure side on-off valve 20 may be configured of a flow-path switching valve. When the low-pressure side on-off valve 20 is configured of the flow-path switching valve, the flow path switching valve may be disposed in the low-pressure side branch portion 15 or a low-pressure side merging portion 21.

The low-pressure side merging portion 21 between the low-pressure refrigerant passage 16 and the low-pressure bypass passage 17 is connected to the downstream side of the refrigerant flow with respect to the interior evaporator 19 and the low-pressure side on-off valve 20. The low-pressure side merging portion 21 is configured of a three-way joint with three inflow/outflow ports, one of which serves as a refrigerant outflow port, and the remaining two of which serve as refrigerant inflow ports.

The accumulator 22 is connected to the side of the refrigerant outflow port of the low-pressure side merging portion 21. The accumulator 22 separates the refrigerant, flowing into the accumulator itself, into a gas phase refrigerant and a liquid phase refrigerant, and flows out the separated gas phase refrigerant and a lubricating oil contained in the refrigerant toward the side of the refrigerant suction port of the compressor 11.

The accumulator 22 also serves as a reservoir that temporarily stores the excess liquid phase refrigerant separated within the accumulator in the cycle. Thus, the accumulator 22 serves to suppress the drawing of the liquid phase refrigerant into the compressor 11 and to prevent the liquid compression by the compressor 11.

Next, the interior air-conditioning unit 30 will be described. The interior air-conditioning unit 30 is disposed inside a dashboard (i.e., instrumental panel) at the foremost portion of the vehicle interior. The interior air-conditioning unit 30 has the air-conditioning case 31 that forms its outer shell and an air passage for ventilation air to be blown into the vehicle interior.

On the most upstream side of the air flow in the air-conditioning case 31, an inside/outside air switch 32 is disposed to switch between air inside the vehicle compartment (i.e., inside air) and the outside air and to introduce the switched air into the air-conditioning case. The inside/outside air switch 32 is a device that adjusts opening areas of an inside-air introduction port and an outside-air introduction port by means of an inside/outside air switching door, thereby changing the ratio of the volume of the inside air to that of the outside air into the air-conditioning case 31.

A blower 33 is disposed on the downstream side of the air flow with respect to the inside/outside air switch 32 so as to blow the air, introduced thereinto from the inside/outside air switch 32, toward the vehicle interior. The blower 33 is an electric blower that includes a centrifugal fan 33a, such as a Sirocco fan, driven by an electric motor 33b. The blower 33 has its blowing capacity (for example, the number of revolutions) controlled by a control voltage output from the air-conditioning controller 50.

On the downstream side of the air flow with respect to the blower 33, the interior evaporator 19, a heater core 41, and the interior condenser 12 are disposed in this order with respect to the ventilation air flow. In other words, the interior evaporator 19 is disposed on the upstream side of the air flow with respect to the heater core 41 and the interior condenser 12. The heater core 41 is disposed on the upstream side of the air flow with respect to the interior condenser 12.

Here, the heater core 41 is disposed in a hot-water circuit 40 through which the coolant of the internal combustion engine 42 for outputting the vehicle-traveling driving force circulates. The heater core 41 is disposed on the downstream side of the coolant flow with respect to the internal combustion engine 42 in the hot-water circuit 40 such that the hot coolant having passed through the internal combustion engine 42 flows into the heater core.

The heater core 41 is a heat exchanger that exchanges heat between the coolant flowing out of the internal combustion engine 42 and the ventilation air, thereby heating the ventilation air. In this embodiment, the heater core 41 configures a heating heat exchanger that heats the ventilation air provided before passing through the interior condenser 12, by using a heat source, other than the heat pump cycle 10.

A cold-air bypass passage 34 is provided within the air-conditioning case 31 to allow the ventilation air having passed through the interior evaporator 19 to flow while bypassing the heater core 41 and the interior condenser 12. An air mix door 35 is disposed within the air-conditioning case 31 on the downstream side of the air flow with respect to the interior evaporator 19 and on the upstream side of the air flow with respect to the heater core 41 and the interior condenser 12.

The air mix door 35 serves as a temperature adjustment portion that adjusts the temperature of air to be blown into the vehicle interior by regulating the ratio of the volume of the air passing through the heater core 41 and the interior condenser 12 to the volume of the air passing through the cold-air bypass passage 34, in the ventilation air having passed through the interior evaporator 19. The air mix door 35 has its operation controlled by a control signal output from the air-conditioning controller 50.

A merging space (not shown) for merging hot air having passed through the heater core 41 and the interior condenser 12 and cold air having passed through the cold-air bypass passage 34 is formed on the downstream side of the air flow with respect to the interior condenser 12 and the cold-air bypass passage 34.

The air-conditioning case 31 is provided, on the most downstream side of the air flow thereof, with a plurality of openings through which the ventilation air merged in the merging space is blown out toward the vehicle interior. Although not shown, the air-conditioning case 31 is also provided with the openings that include a defroster opening for blowing the air toward the inner surface of a windshield of the vehicle, a face opening for blowing the conditioned air toward the upper body of an occupant in the vehicle interior, and a foot opening for blowing the conditioned air toward the feet of the occupant.

Although not shown, a defroster door, a face door, and a foot door are disposed on the upstream side of the air flow with respect to the respective openings, as blowing mode doors for adjusting the opening areas of the respective openings. These blowing mode doors are driven by an actuator that has its operation controlled by a control signal output from the air-conditioning controller 50, via a link mechanism (not shown) or the like.

Furthermore, although not shown, a face air outlet, a foot air outlet, and a defroster air outlet, provided in the vehicle interior, are connected to the downstream side of the air flow with respect to the respective openings via ducts forming respective air passages.

Next, an electric control unit in this embodiment will be described with reference to FIG. 2. The air-conditioning controller 50 is configured of a microcomputer including a storage unit, such as the CPU, ROM, and RAM, and a peripheral circuit thereof. The air-conditioning controller 50 performs various computations and processing based on control programs stored in the storage unit to thereby control the operations of various air-conditioning control devices that are connected to its output side. The storage unit in the air-conditioning controller 50 is configured of a non-transitional physical storage medium.

A group of air-conditioning control sensors is connected to the input side of the air-conditioning controller 50. Specifically, the air-conditioning controller 50 is connected to an inside-air sensor for detecting the inside-air temperature, an outside-air sensor for detecting the outside-air temperature, a solar radiation sensor for detecting the amount of solar radiation into the vehicle interior, and the like, as a sensor that detects the state of the environment inside and outside the vehicle.

The air-conditioning controller 50 is connected to a sensor that detects an operating state of the heat pump cycle 10. Specifically, the air-conditioning controller 50 is connected to a first temperature sensor 51, a second temperature sensor 52, a refrigerant pressure sensor 53, and the like. The first temperature sensor 51 detects the temperature of air having passed through the interior evaporator 19. The second temperature sensor 52 detects the temperature of a high-pressure refrigerant flowing into the interior condenser 12. The refrigerant pressure sensor 53 detects the pressure of the refrigerant having passed through the interior condenser 12.

For convenience of explanation, in this embodiment, the temperature of the air having passed through the interior evaporator 19 is referred to as an evaporator temperature Te. In this embodiment, the temperature of the high-pressure refrigerant discharged from the compressor 11 and flowing into the interior condenser 12 is referred to as a discharge refrigerant temperature Th. Furthermore, in this embodiment, the pressure of the refrigerant having passed through the interior condenser 12 is sometimes referred to as a high-pressure refrigerant pressure Ph. The discharge refrigerant temperature Th can be interpreted as the refrigerant temperature in the interior condenser 12.

The first temperature sensor 51 can be considered to be a sensor that directly detects the temperature of a heat exchange fin in the interior evaporator 19 as the evaporator temperature Te, a sensor that indirectly detects the temperature of the refrigerant flowing through the interior evaporator 19 as the evaporator temperature Te, or the like, but may use either sensor.

The second temperature sensor 52 can be considered to be a sensor that directly detects a discharge refrigerant temperature Th at the compressor 11, a sensor that indirectly detects the temperature of the heat exchange fin in the interior condenser 12 as the discharge refrigerant temperature Th, or the like, but may use either sensor.

Further, the air-conditioning controller 50 is connected to the third temperature sensor 54 that detects the temperature of the coolant flowing into the heater core 41. The third temperature sensor 54 is a sensor that calculates the temperature of the ventilation air heated by the heater core 41 and provided before passing through the interior condenser 12, based on the temperature of the coolant flowing into the heater core 41. For convenience of explanation, in this embodiment, the temperature of the coolant flowing into the heater core 41 is referred to as a heater-core water temperature Twh. In this embodiment, the temperature of the ventilation air heated by the heater core 41 and provided before passing through the interior condenser 12 is referred to as a heater-core blowing temperature Tca.

The heater-core blowing temperature Tca is a temperature that is slightly lower than the heater-core water temperature Twh of the coolant flowing into the heater core 41, in accordance with the heat exchange efficiency of the interior condenser 12. Thus, the air-conditioning controller 50 in this embodiment subtracts a predetermined correction temperature from the heater-core water temperature Twh to thereby calculate the heater-core blowing temperature Tca.

The air-conditioning controller 50 is connected to an operation panel 60 on which various air-conditioning operation switches are disposed. Operation signals from these air-conditioning operation switches on the operation panel 60 are input to the air-conditioning controller 50. Specifically, the operation panel 60 is provided with various air-conditioning operation switches, namely, an operation switch for the vehicle air conditioner 1, a temperature setting switch for setting a target temperature of the vehicle interior, an A/C switch for setting whether the ventilation air is cooled by the interior evaporator 19 or not.

The air-conditioning controller 50 is connected to enable bidirectional communication with respect to a vehicle controller 70 that controls the entire vehicle. The air-conditioning controller 50 receives various vehicle information input from the vehicle controller 70, including an operating state of the internal combustion engine 42 and a vehicle traveling state.

The air-conditioning controller 50 in this embodiment is a device that integrates therein control units (for example, hardware and software) for controlling the operations of various control devices connected to its output side. The control units integrated in the air-conditioning controller 50 are, for example, an operation mode switching unit 50a for switching an operation mode of the heat pump cycle 10 by controlling the operations of various control devices, a compressor control unit 50b for controlling an operation of the inverter 80, or the like.

In this embodiment, the operation mode switching unit 50a configures an air-heating switching portion that switches between hot-water heating in which the ventilation air is heated by the heater core 41 while stopping the operation of the compressor 11 and HP air-heating in which the ventilation air is heated by at least the interior condenser 12 while operating the compressor 11. In this embodiment, the compressor control unit 50b configures a heat-exchange control unit that controls the inverter 80 serving as a heat-exchange adjustment portion.

Now, the operation of the vehicle air conditioner 1 with the above-mentioned structure will be described. The vehicle air conditioner 1 in this embodiment can be switched to any one of the air-cooling mode, the air-heating mode, and the dehumidification heating mode. These operation modes can be switched by air-conditioning control processing executed by the air-conditioning controller 50.

The air-conditioning control processing executed by the air-conditioning controller 50 will be described with reference to a flowchart shown in FIG. 3. The air-conditioning control processing is started when an operation switch for the vehicle air conditioner 1 on the operation panel is turned on. The respective steps of the flowchart shown in FIG. 3 are implemented by the air-conditioning controller 50 and can be interpreted as a function implementation portion that implements the respective functions in the respective steps.

Figure 3:
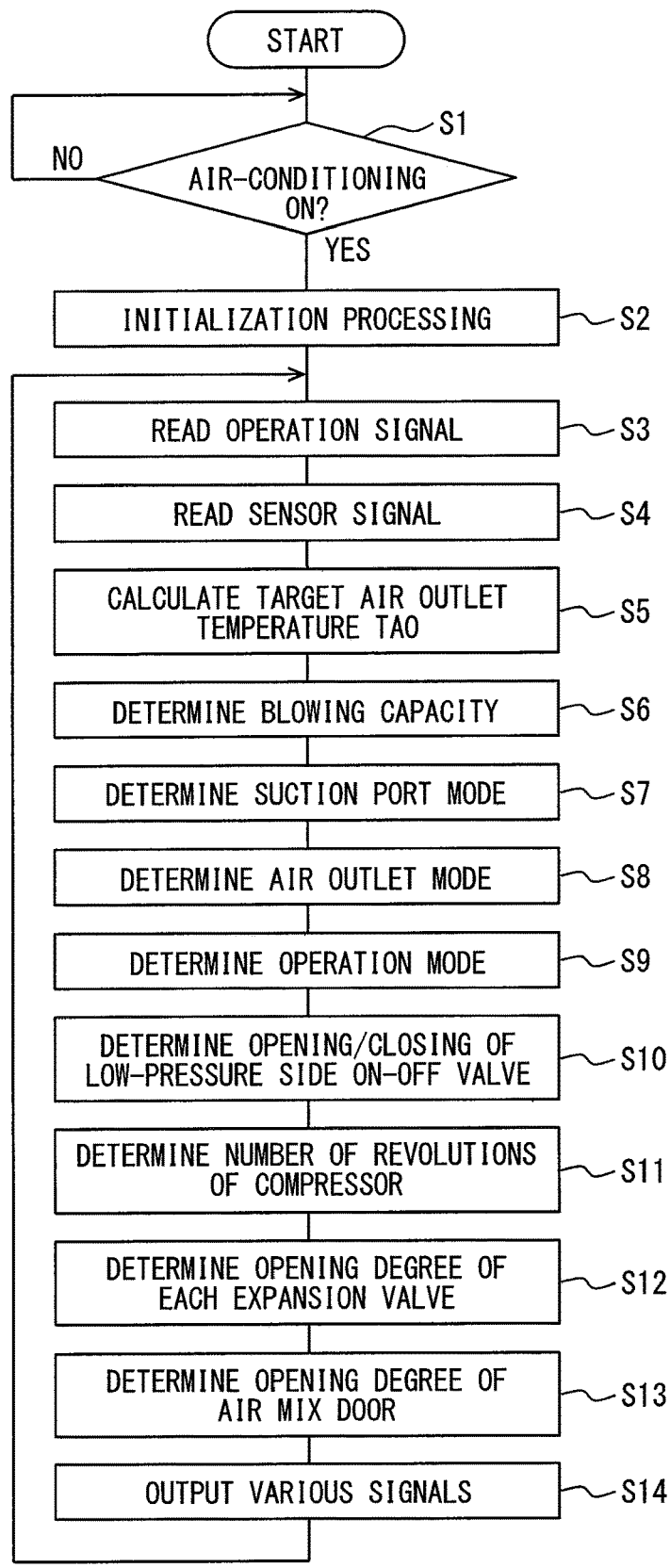
FIG. 3 is a flowchart showing control processing executed by the air-conditioning controller according to the first embodiment.

First, as shown in FIG. 3, in the air-conditioning control processing, the air-conditioning controller 50 determines whether the operation switch of the vehicle air conditioner 1 is turned on (i.e., air-conditioning ON) or not (S1). When the operation switch of the vehicle air conditioner 1 is consequently determined to be turned on, the air-conditioning controller 50 performs initialization processing, which includes initialization of a flag, a timer, etc., stored in the storage unit, and aligning various control units at respective initial positions (S2). In the initialization processing, such a parameter may be set at a previous value stored in the storage unit when the operation of the vehicle air conditioner 1 is stopped.

Subsequently, the air-conditioning controller 50 reads an operation signal from the operation panel 60 (S3). The air-conditioning controller 50 reads various sensor signals from the air-conditioning control sensor group (S4). Then, the air-conditioning controller 50 calculates a target air outlet temperature TAO of the ventilation air to be blown into the vehicle interior based on various signals read in steps S3 and S4 (S5).

Specifically, in the processing of step S5, the target air outlet temperature TAO is calculated using formula F1 below.

$$TAO = K_{set} \times T_{set} - K_r \times T_r - K_{am} \times T_{am} - K_s \times A_s + C \quad (F1)$$

where Tset is a target temperature of the vehicle interior preset by a temperature setting switch, Tr is a detection signal detected by the inside-air sensor, Tam is a detection signal detected by the outside-air sensor, and As is a detection signal detected by the solar radiation sensor. Kset, Kr, Kam, and Ks are control gains, and C is a correction constant.

Subsequently, the air-conditioning controller 50 determines a blowing capacity of the blower 33 (S6). In the processing at step S6, the blowing capacity of the blower 33 is determined based on the target air outlet temperature TAO calculated in step S5, with reference to a control map pre-stored in the storage unit.

The air-conditioning controller 50 in this embodiment determines the blowing capacity of the blower 33 to be set at a level around the maximum capacity such that a blowing amount from the blower 33 is increased when the target air outlet temperature TAO is in either an ultra-low temperature range or an ultra-high temperature range. Further, the air-conditioning controller 50 in this embodiment determines the blowing capacity of the blower 33 to be set lower than the level around the maximum capacity such that a blowing amount from the blower 33 is decreased when the target air outlet temperature TAO increases from the ultra-low temperature range to an intermediate temperature range or decreases from the ultra-high temperature range to the intermediate temperature range.

Subsequently, the air-conditioning controller 50 determines a suction port mode indicative of a switching state of the inside/outside air switch 32 (S7). In the processing at step S7, the suction port mode is determined based on the target air outlet temperature TAO with reference to the control map pre-stored in the storage unit. The air-conditioning controller 50 in this embodiment basically determines the suction port mode to be an outside-air mode of introducing the outside air. The air-conditioning controller 50 in this embodiment determines the suction port mode to be an inside-air mode of introducing the inside air, on the condition in which the target air outlet temperature TAO is in the ultra-low temperature range and a high air-cooling performance is required, on the condition in which the target air outlet temperature TAO is in the ultra-high temperature range and a high air-heating performance is required.

Subsequently, the air-conditioning controller 50 determines an air outlet mode (S8). In the processing at step S8, the air outlet mode is determined with reference to the control map pre-stored in the storage unit, based on the target air outlet temperature TAO. The air-conditioning controller 50 in this embodiment determines the air outlet mode in such a manner as to shift from the foot mode to the bi-level mode and then the face mode in this order as the target air outlet temperature TAO is decreased from the high-temperature range to the low-temperature range.

Subsequently, the air-conditioning controller 50 determines an operation mode of the vehicle air conditioner 1 based on various signals read in steps S3 and S4 and the target air outlet temperature TAO calculated in step S5 (S9).

For example, in the processing at step S9, the operation mode is determined to be the air-cooling mode for the air-cooling of the vehicle interior, when the A/C switch is turned on and the target air outlet temperature TAO is lower than a pre-set air-cooling reference value. In the processing at step S9, the operation mode is determined to be the dehumidification heating mode for the dehumidifying and air-heating of the vehicle interior, when the A/C switch is turned on and the target air outlet temperature TAO is equal to or higher than the air-cooling reference value. In the processing at step S9, the operation mode is determined to be the air-heating mode for the air-heating of the vehicle interior, when the A/C switch is turned off and the target air outlet temperature TAO is equal to or higher than an air-heating reference value.

Subsequently, the air-conditioning controller 50 determines an open/closed state of the low-pressure side on-off valve 20 based on the operation mode determined at step S9 (S10). As shown in FIG. 4, in the processing at step S10, the low-pressure side on-off valve 20 is determined to be brought into a closed state, when the operation mode is determined to be either the air-cooling mode or the dehumidification heating mode in the processing at step S9. In the processing at step S10, the low-pressure side on-off valve 20 is determined to be brought into an open state, when the operation mode is determined to be the air-heating mode in the processing at step S9.

Subsequently, the air-conditioning controller 50 determines the number of revolutions of the compressor 11 based on various signals read in steps S3 and S4, the target air outlet temperature TAO calculated in step S5, and the operation mode determined in step S9 (S11).

In the processing at step S11, the number of revolutions of the compressor 11 is determined as follows, when the operation mode is determined to be either the air-cooling mode or the dehumidification heating mode in the processing at step S9. In the processing at step S11, first, a target evaporator temperature TEO of the interior evaporator 19 is determined based on the target air outlet temperature TAO, with reference to the control map pre-stored in the storage unit. The target evaporator temperature TEO is determined to be a higher temperature (for example, 1° C.) than the frost formation temperature (for example, 0° C.) in order to prevent the frost formation (i.e., frost) at the interior evaporator 19.

Then, in the processing at step S11, the number of revolutions of the compressor 11 is determined such that the evaporator temperature Te approaches the target evaporator temperature TEO based on a deviation between the target evaporator temperature TEO and an evaporator temperature Te detected by the first temperature sensor 51.

In the processing at step S11, the number of revolutions of the compressor 11 is determined based on the heater-core blowing temperature Tca, the high-pressure refrigerant pressure Ph, the target air outlet temperature TAO, and the discharge refrigerant temperature Th when the operation mode is determined to be the air-heating mode in the processing at step S9.

The details of the processing at step S11 in the air-heating mode, which is determined in the processing at step S9, will be described below using the flowchart of FIG. 5. The control routine shown in FIG. 5 indicates the processing contents processed by the air-conditioning controller 50 in step S11 when the operation mode is determined to be the air-heating mode in the processing at step S9.

As shown in FIG. 5, first, the air-conditioning controller 50 calculates a heater-core blowing temperature Tca from the heater-core water temperature Twh detected by the third temperature sensor 54, and determines whether or not the calculated heater-core blowing temperature Tca is equal to or higher than the target air outlet temperature TAO (S110).

As a result, the air-heating of the vehicle interior can be performed by hot-water heating using the internal combustion engine 42 when the heater-core blowing temperature Tca is determined to be equal to or higher than the target air outlet temperature TAO. For this reason, the air-conditioning controller 50 determines the number of revolutions of the compressor 11 to be zero when the heater-core blowing temperature Tca is determined to be equal to or higher than the target air outlet temperature TAO. That is, when the vehicle air conditioner satisfies a condition in which condition in which the heater-core blowing temperature Tca is higher than the target air outlet temperature TAO, the air-conditioning controller 50 stops the operation of the compressor 11 and determines the operation mode to be hot-water heating in which the ventilation air is heated using the internal combustion engine 42 as a heat source (S111).

Meanwhile, the air-heating of the vehicle interior cannot be performed sufficiently in the hot-water heating using the internal combustion engine 42, when the heater-core blowing temperature Tca is determined to be lower than the target air outlet temperature TAO. Thus, when the heater-core blowing temperature Tca is determined to be lower than the target air outlet temperature TAO, the air-conditioning controller 50 operates the compressor 11 and thereby switches the operation mode to the HP air-heating in which the ventilation air is heated by the interior condenser 12.

When switching from the hot-water heating to the HP air-heating, a blowing air temperature TAV as a temperature of the air blown from the interior air-conditioning unit 30 into the vehicle interior is decreased in some cases. This point will be described with reference to FIG. 6. FIG. 6 shows an example of changes in the blowing air temperature TAV, the target air outlet temperature TAO, the heater-core blowing temperature Tca, and the discharge refrigerant temperature Th when switching from the hot-water heating to the HP air-heating.

As shown in FIG. 6, when switching from the hot-water heating to the HP air-heating, the compressor 11 of the heat pump cycle 10 is operated, so that the discharge refrigerant temperature Th gradually increases to approach the target air outlet temperature TAO.

In the air-heating mode of this embodiment, the heat exchanger that serves as a radiator to dissipate heat from the refrigerant is only the interior condenser 12. Thus, the heat pump cycle 10 achieves a balance so that the discharge refrigerant temperature Th becomes higher than the heater-core blowing temperature Tca in a steady state in which the number of revolutions of the compressor 11 is stabilized.

However, at start-up of the heat pump cycle 10, the refrigerant in the cycle takes the temperature and pressure corresponding to its ambient temperature. Thus, the discharge refrigerant temperature Th occasionally becomes lower than the heater-core blowing temperature Tca.

When the compressor 11 is operated while the temperature of the refrigerant in the cycle is lower than the heater-core blowing temperature Tca, the refrigerant having a lower temperature than the heater-core blowing temperature Tca circulates through the cycle. At this time, the refrigerant having the lower temperature than the heater-core blowing temperature Tca continues to flow into the interior condenser 12. Thus, in the interior condenser 12, the refrigerant flowing through the interior condenser 12 continues to absorb heat from air having passed through the heater core 41 over a period of time until the discharge refrigerant temperature Th becomes higher than the heater-core blowing temperature Tca. Consequently, the blowing air temperature TAV would become lower than the target air outlet temperature TAO.

Figures 7, 8:
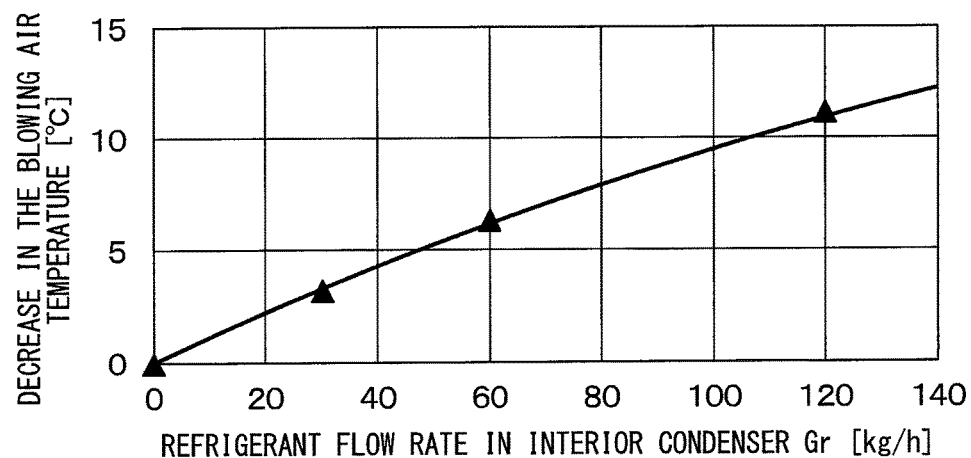
FIG. 7 is a graph showing a relationship between the flow rate of a refrigerant and a decrease in the blown air temperature in an interior condenser.
FIG. 8 is a table showing an opening degree of each expansion valve in the respective operation modes of the vehicle air conditioner according to the first embodiment.
Figure 9:
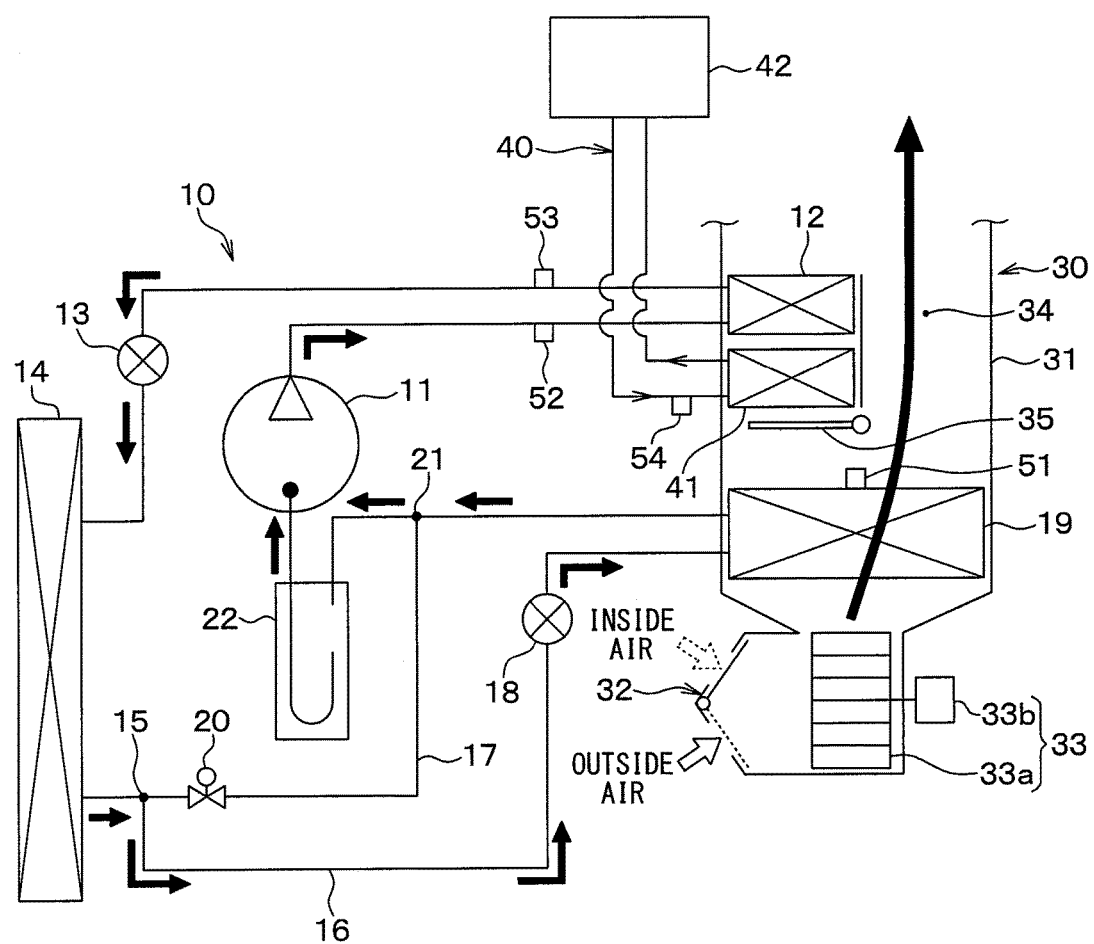
FIG. 9 is an exemplary configuration diagram showing the flow of a refrigerant in an air-cooling mode and in a dehumidification heating mode of the vehicle air conditioner according to the first embodiment.
Figure 10:
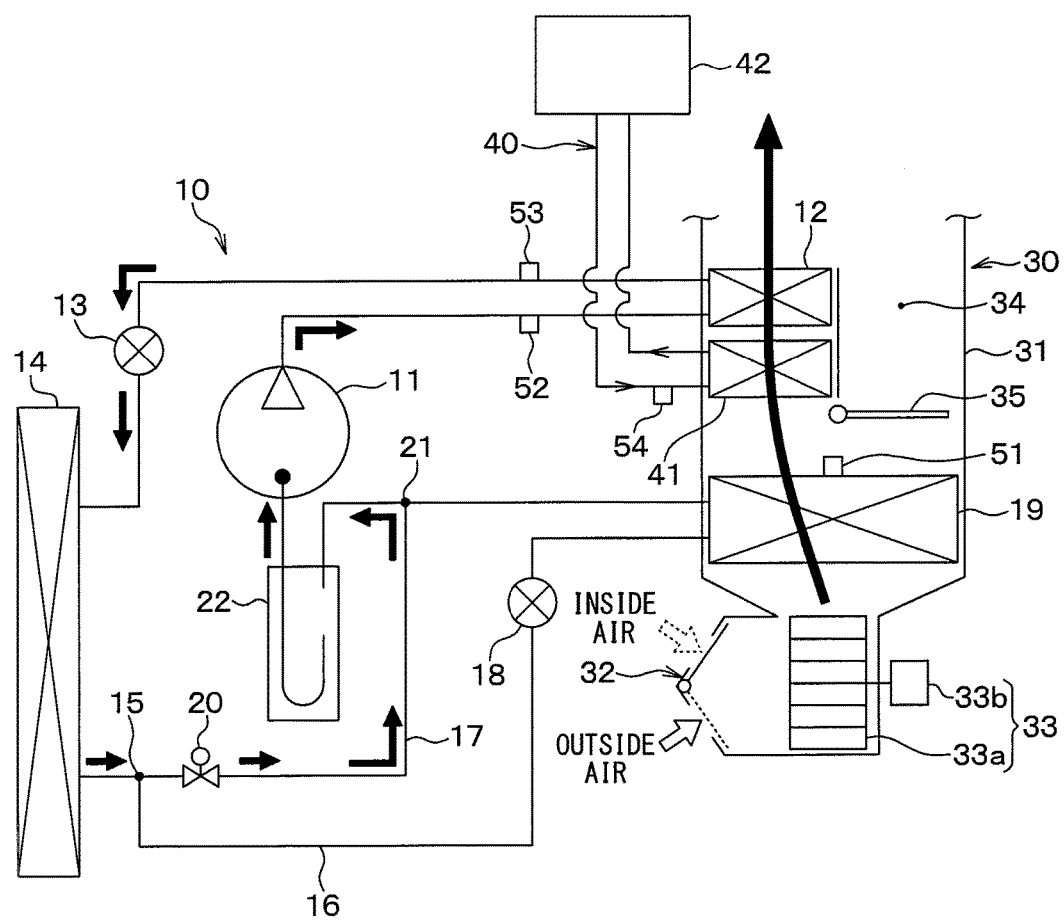
FIG. 10 is an exemplary configuration diagram showing the flow of a refrigerant in the HP air-heating of the vehicle air conditioner according to the first embodiment.

FIG. 7 is an estimated result that is obtained by estimating a decrease in the blowing air temperature TAV relative to a change in the refrigerant flow rate Gr in the interior condenser 12. FIG. 7 shows the estimated result on conditions where a temperature difference $\Delta T$ ($\Delta T=Tca-Th$) between the heater-core blowing temperature Tca and the discharge refrigerant temperature Th is 30° C., and the volume of the ventilation air passing through the heater core 41 and the interior condenser 12 is 200 m³/h.

As shown in FIG. 7, the amount of heat absorbed from the ventilation air in the interior condenser 12 also increases with increasing refrigerant flow rate Gr of the refrigerant flowing through the interior condenser 12, so that the decrease in the temperature of the blowing air temperature TAV tends to increase.

The air-conditioning controller 50 in this embodiment executes the processing for decreasing the amount of heat exchange between the high-pressure refrigerant and the ventilation air in the interior condenser 12, if the air conditioner satisfies the condition in which the discharge refrigerant temperature Th is equal to or lower than the heater-core blowing temperature Tca when switching from the hot-water heating to the HP air-heating.

Specifically, as shown in FIG. 5, the air-conditioning controller 50 determines whether or not the discharge refrigerant temperature Th detected by the second temperature sensor 52 is equal to or lower than the heater-core blowing temperature Tca (S112). As a result, when the discharge refrigerant temperature Th is determined to be equal to or lower than the heater-core blowing temperature Tca, the air-conditioning controller 50 determines the number of revolutions of the compressor 11 to be set at the minimum number of revolutions (S113).

In this way, by determining the number of revolutions of the compressor 11 to be set at the minimum number of revolutions, the flow rate of the refrigerant flowing into the interior condenser 12 is decreased. Thus, the amount of heat absorbed from the ventilation air in the interior condenser 12 is decreased, thereby making it possible to suppress a decrease in the blowing air temperature TAV.

Meanwhile, when the discharge refrigerant temperature Th is determined to exceed the heater-core blowing temperature Tca in the determination processing at the step S112, the refrigerant never absorbs heat from the ventilation air in the interior condenser 12. Thus, when the discharge refrigerant temperature Th is determined to exceed the heater-core blowing temperature Ta in the determination processing at step S112, the air-conditioning controller 50 determines the number of revolutions of the compressor 11 to be set at the normal number of revolutions (S114).

Specifically, in the processing at step S114, a target pressure Phd of the high-pressure refrigerant pressure Ph is determined with reference to the control map pre-stored in the storage unit, based on the target air outlet temperature TAO and the high-pressure refrigerant pressure Ph detected by the refrigerant pressure sensor 53. In the processing at step S114, the number of revolutions of the compressor 11 is determined such that the high-pressure refrigerant pressure Ph approaches the target pressure Phd based on a deviation between the target pressure Phd and the high-pressure refrigerant pressure Ph.

Returning to FIG. 3, after determining the number of revolutions of the compressor 11 in step S11, an opening degree of each expansion valve 13 is determined (S12). As shown in FIG. 8, in the processing at step S12, the first expansion valve 13 is determined to be in a fully open state, and the second expansion valve 18 is determined to be in a throttle state, when the operation mode is determined to be either the air-cooling mode or the dehumidification heating mode in the processing at step S9. A throttle opening degree of the second expansion valve 18 is determined such that a supercooling degree (i.e., subcooling degree) of the refrigerant flowing into the second expansion valve 18 approaches a target supercooling temperature. The target supercooling degree is determined based on the outside air temperature or the like detected by the outside-air sensor, with reference to the control map pre-stored in the storage unit.

In the processing at step S12, the first expansion valve 13 is determined to be in a throttle state, and the second expansion valve 18 is determined to be in a completely closed state, when the operation mode is determined to be the air-heating mode in the processing at step S9. A throttle opening degree of the first expansion valve 13 is determined such that a supercooling degree of the refrigerant flowing into the first expansion valve 13 approaches the target supercooling temperature. The target supercooling degree is determined based on a detected value or the like by the outside-air sensor, with reference to the control map pre-stored in the storage unit, like the air-cooling mode.

Subsequently, the air-conditioning controller 50 determines an opening degree of the air mix door 35 (S13). In the processing at step S13, during the air-cooling mode, the air-conditioning controller 50 determines the opening degree of the air mix door 35 such that the air mix door 35 closes an air passage for the heater core 41 and the interior condenser 12, and that the whole flow rate of the ventilation air having passed through the interior evaporator 19 passes through the cold-air bypass passage 34.

In the processing at step S13, during the dehumidification heating mode and the air-heating mode, the air-conditioning controller 50 determines the opening degree of the air mix door 35 such that the air mix door 35 closes the cold-air bypass passage 34, and that the whole flow rate of the ventilation air having passed through the interior evaporator 19 passes through the heater core 41 and the interior condenser 12.

When performing the hot-water heating as the air-heating mode, the door opening degree SW of the air mix door 35 may be determined in accordance with the target air outlet temperature TAO, the evaporator temperature Te, and the heater-core water temperature Twh. Specifically, the door opening degree SW may be calculated by formula F2 below.

$$SW=\{(TAO-Te)/(Twh-Te)\}\times 100[\%] \tag{F2}$$

SW≤0[%] corresponds to the maximum air-cooling position of the air mix door 35 that sets the cold-air bypass passage 34 in the fully open state. Meanwhile, SW≥100[%] corresponds to the maximum air-heating position of the air mix door 35 that sets the air passage for the heater core 41 and the interior condenser 12 in the fully open state.

Subsequently, the air-conditioning controller 50 outputs the control signals and the like determined in steps S6 to S13, to respective control devices (S14). Thereafter, the air-conditioning controller 50 repeatedly performs the control processing from steps S3 to S13 in a predetermined cycle until the operation of the vehicle air conditioner 1 is requested to stop through the operation panel 60.

The air-conditioning controller 50 outputs a control signal regarding the number of revolutions of the compressor 11 to the inverter 80. The inverter 80 controls the number of revolutions of the compressor 11 in accordance with the control signal output from the air-conditioning controller 50.

The vehicle air conditioner 1 in this embodiment is controlled as mentioned above. Thus, the vehicle air conditioner 1 operates in accordance with the operation mode selected in step S9 as follows.

(A) Air-Cooling Mode

In the air-cooling mode, the air-conditioning controller 50 operates the compressor 11 while setting the low-pressure side on-off valve 20 in the closed state, the first expansion valve 13 in the fully open state, and the second expansion valve 18 in the throttle state. Thus, as indicated by the arrows in FIG. 9, in the air-cooling mode, the refrigerant discharged from the compressor 11 flows through the interior condenser 12, the first expansion valve 13, the exterior heat exchanger 14, the second expansion valve 18, the interior evaporator 19, and the accumulator 22 in this order, and then is drawn into the compressor 11 again.

Specifically, in the air-cooling mode, the refrigerant discharged from the compressor 11 flows into the interior condenser 12. At this time, since the air mix door 35 closes the air passage for the heater core 41 and the interior condenser 12, the refrigerant having flowed into the interior condenser 12 flows out of the interior condenser 12 without almost dissipating heat into the ventilation air.

Since the first expansion valve 13 is in the fully open state, the refrigerant flowing out of the interior condenser 12 flows into the exterior heat exchanger 14 without almost being decompressed by the first expansion valve 13. The refrigerant flowing into the exterior heat exchanger 14 dissipates its heat by exchanging heat with the outside air and thereby is cooled down to the target supercooling degree.

Since the low-pressure side on-off valve 20 is closed and the second expansion valve 18 is in the throttle state, the refrigerant flowing out of the exterior heat exchanger 14 flows into the second expansion valve 18 to be decompressed into the low-pressure refrigerant. The low-pressure refrigerant flowing out of the second expansion valve 18 flows into the interior evaporator 19 and absorbs heat from the ventilation air blown from the blower 33 to evaporate. In this way, the ventilation air is cooled and dehumidified.

The refrigerant flowing out of the interior evaporator 19 flows into the accumulator 22 to be separated into a gas phase refrigerant and a liquid phase refrigerant. The gas phase refrigerant separated by the accumulator 22 is drawn into the compressor 11 and then compressed again.

Here, the liquid phase refrigerant separated by the accumulator 22 is stored in the accumulator 22 as an excessive refrigerant that is not necessary for the heat pump cycle 10 to exhibit a required refrigeration capacity. The same goes for the dehumidification heating mode and the air-heating mode.

As mentioned above, in the air-cooling mode, the refrigerant dissipates its heat in the exterior heat exchanger 14, and the refrigerant is evaporated in the interior evaporator 19, thereby cooling the ventilation air to be blown into the vehicle interior. Thus, the air-cooling of the vehicle interior can be achieved.

(B) Dehumidification Heating Mode

In the dehumidification heating mode, the air-conditioning controller 50 operates the compressor 11 while setting the low-pressure side on-off valve 20 in the closed state, the first expansion valve 13 in the fully open state, and the second expansion valve 18 in the throttle state. Thus, in the dehumidification heating mode, the refrigerant flows in the same way as in the air-cooling mode, as indicated by the arrows in FIG. 9.

Specifically, in the dehumidification heating mode, the high-pressure refrigerant discharged from the compressor 11 flows into the interior condenser 12. At this time, since the air mix door 35 fully opens the air passage for the heater core 41 and the interior condenser 12, the refrigerant having flowed into the interior condenser 12 exchanges heat with the ventilation air having passed through the heater core 41 and thereby dissipates heat. In this way, the ventilation air is heated such that its temperature approaches the target air outlet temperature TAO.

The refrigerant flowing out of the interior condenser 12 flows into the exterior heat exchanger 14 via the first expansion valve 13 in the same way as in the air-cooling mode. The refrigerant flowing into the exterior heat exchanger 14 dissipates its heat by exchanging heat with the outside air and thereby is cooled down to the target supercooling degree. Further, the refrigerant flowing out of the exterior heat exchanger 14 flows through the second expansion valve 18, the interior evaporator 19, the accumulator 22, and the compressor 11 in this order in the same way as in the air-cooling mode.

As mentioned above, in the dehumidification heating mode, the refrigerant dissipates its heat in the interior condenser 12 and the exterior heat exchanger 14, and the refrigerant is evaporated in the interior evaporator 19, so that the ventilation air cooled and dehumidified in the interior evaporator 19 is heated by the interior condenser 12. Thus, the dehumidification heating of the vehicle interior can be achieved.

(C) Air-Heating Mode

In the air-heating mode, the air-conditioning controller 50 sets the low-pressure side on-off valve 20 in the open state, the first expansion valve 13 in the throttle state, and the second expansion valve 18 in the completely closed state. In such a state, the air-conditioning controller 50 switches between the hot-water heating in which the ventilation air is heated using the internal combustion engine 42 as a heat source and the HP air-heating in which the ventilation air is heated by the interior condenser 12, according to the heater-core blowing temperature Tca and the target air outlet temperature TAO.

(Hot-Water Heating)

When the vehicle air conditioner satisfies a condition that the heater-core blowing temperature Tca is equal to or higher than the target air outlet temperature TAO, the air-conditioning controller 50 stops the operation of the compressor 11 and performs the hot-water heating using the internal combustion engine 42 as the heat source. In the hot-water heating, the coolant of the internal combustion engine 42 exchanges heat with the ventilation air in the heater core 41, thereby heating the ventilation air. Thus, the air-heating of the vehicle interior can be achieved.

(HP Air-Heating)

When the vehicle air conditioner satisfies a condition in which the heater-core blowing temperature Tca is lower than the target air outlet temperature TAO, the air-conditioning controller 50 operates the compressor 11 and switches from the hot-water heating to the HP air-heating. As indicated by the arrows in FIG. 10, in the HP air-heating, the refrigerant discharged from the compressor 11 flows through the interior condenser 12, the first expansion valve 13, the exterior heat exchanger 14, and the accumulator 22 in this order, and then is drawn into the compressor 11 again.

Specifically, in the HP air-heating, the refrigerant discharged from the compressor 11 flows into the interior condenser 12 and exchanges heat with the ventilation air. At this time, when the discharge refrigerant temperature Th is equal to or lower than the heater-core blowing temperature Tca, the air-conditioning controller 50 sets the number of revolutions of the compressor 11 at the minimum number of revolutions so as to decrease the amount of heat exchange between the refrigerant and the ventilation air in the interior condenser 12. In this case, the refrigerant flowing into the interior condenser 12 flows out of the interior condenser 12 without almost absorbing heat from the ventilation air.

Meanwhile, when the discharge refrigerant temperature Th exceeds the heater-core blowing temperature Tca, the air-conditioning controller 50 sets the number of revolutions of the compressor 11 at the normal number of revolutions. In this case, the high-pressure refrigerant flowing into the interior condenser 12 dissipates heat into the ventilation air. Thus, the ventilation air is heated in the interior condenser 12 such that its temperature approaches the target air outlet temperature TAO.

Since the first expansion valve 13 is in the throttle state, the refrigerant flowing out of the interior condenser 12 flows into the first expansion valve 13 to be decompressed into the low-pressure refrigerant. The low-pressure refrigerant flowing out of the first expansion valve 13 flows into the exterior heat exchanger 14. The refrigerant flowing into the exterior heat exchanger 14 absorbs heat by exchanging heat with the outside air to thereby evaporate.

Since the low-pressure side on-off valve 20 is opened and the second expansion valve 18 is in the completely closed state, the refrigerant flowing out of the exterior heat exchanger 14 flows into the accumulator 22 to be separated into a gas phase refrigerant and a liquid phase refrigerant. The gas phase refrigerant separated by the accumulator 22 is drawn into the compressor 11 and then compressed again.

As mentioned above, in the air-heating mode of this embodiment, unless the discharge refrigerant temperature Th is equal to or lower than the heater-core blowing temperature Tca, the ventilation air can be heated by at least one of the heater core 41 and the interior condenser 12. Thus, the air-heating of the vehicle interior can be achieved.

Meanwhile, during the HP air-heating in the air-heating mode of this embodiment, when the vehicle air conditioner satisfies a condition in which the discharge refrigerant temperature Th is equal to or lower than the heater-core blowing temperature Tca, the number of revolutions of the compressor 11 is decreased, thereby reducing the flow rate of the refrigerant flowing into the interior condenser 12. Thus, the amount of heat absorbed from the ventilation air in the interior condenser 12 is suppressed, thereby making it possible to suppress a decrease in the blowing air temperature TAV of the air from the interior air-conditioning unit 30.

The vehicle air conditioner 1 in this embodiment, mentioned above, is configured to decrease the amount of heat exchange between the refrigerant and the ventilation air in the interior condenser 12, if the vehicle air conditioner satisfies the condition in which the discharge refrigerant temperature Th is equal to or lower than the heater-core blowing temperature Tca when performing the HP air-heating.

Accordingly, the absorption of heat by the high-pressure refrigerant flowing through the interior condenser 12 from the ventilation air can be suppressed. Thus, the decrease in the blowing air temperature TAV of the air to be blown into the vehicle interior can be suppressed when switching from the hot-water heating using a heat source other than the heat pump cycle 10 to the HP air-heating using the high-pressure refrigerant in the heat pump cycle 10. Consequently, the comfort for users who use the vehicle air conditioner 1 can be ensured.

The vehicle air conditioner in this embodiment is configured to decrease the amount of heat exchange between the high-pressure refrigerant and the ventilation air in the interior condenser 12 by decreasing the number of revolutions of the compressor 11, when the discharge refrigerant temperature Th is equal to or lower than the heater-core blowing temperature Tca. Thus, the power consumption in the compressor 11 can be reduced while suppressing unnecessary heat exchange between the high-pressure refrigerant and the ventilation air in the interior condenser 12.

The vehicle air conditioner in this embodiment is configured to increase the amount of heat exchange between the refrigerant and the ventilation air in the interior condenser 12, if the discharge refrigerant temperature Th exceeds the heater-core blowing temperature Tca when performing the HP air-heating. Thus, the blowing air temperature TAV of the air to be blown into the vehicle interior during the HP air-heating can approach the target air outlet temperature TAO.

This embodiment has explained the example in which the heater-core blowing temperature Tca is calculated from the heater-core water temperature Twh detected by the third temperature sensor 54, but is not limited thereto. For example, a temperature sensor may be provided to detect the temperature of the heat exchange fin of the heater core 41, and thereby the heater-core blowing temperature Tca may be directly detected by the temperature sensor. The heater-core water temperature Twh detected by the third temperature sensor 54 may be detected as the heater-core blowing temperature Tca. The same goes for the following embodiments.

This embodiment has explained the example in which the discharge refrigerant temperature Th is detected by the second temperature sensor 52, but is not limited thereto. For example, a saturated refrigerant temperature in the interior condenser 12 may be calculated based on the high-pressure refrigerant pressure Ph detected by the refrigerant pressure sensor 53, and thereby the saturated refrigerant temperature may be used as the discharge refrigerant temperature Th. The same goes for the following embodiments.

Like this embodiment, in the HP air-heating, the number of revolutions of the compressor 11 is desirably set at the minimum number of revolutions when the vehicle air conditioner satisfies the condition in which the discharge refrigerant temperature Th is equal to or lower than the heater-core blowing temperature Tca, but is not limited thereto.

When the vehicle air conditioner satisfies the condition in which the discharge refrigerant temperature Th is equal to or lower than the heater-core blowing temperature Tca in the HP air-heating, the number of revolutions of the compressor 11 may be set lower than the normal number of revolutions of the compressor 11 exhibited when the discharge refrigerant temperature Th exceeds the heater-core blowing temperature Tca. For example, when the discharge refrigerant temperature Th is equal to or lower than the heater-core blowing temperature Tca in the HP air-heating, the number of revolutions of the compressor 11 may be set at the number of revolutions obtained by subtracting a predetermined value from the normal number of revolutions of the compressor 11.

In the above description, whether or not the discharge refrigerant temperature Th is equal to or lower than the heater-core blowing temperature Tca is determined by comparing the actual discharge refrigerant temperature Th with the heater-core blowing temperature Tca by way of example, but is not limited thereto. The discharge refrigerant temperature Th becomes a temperature close to the temperature of ambient air (for example, outside air) at start-up of the heat pump cycle 10. Thus, for example, the air-conditioning controller 50 may determine whether or not the vehicle air conditioner satisfies the condition in which the discharge refrigerant temperature Th is equal to or lower than the heater-core blowing temperature Tca, by comparing the outside air temperature with the heater-core blowing temperature Tca.

Second Embodiment

Next, a second embodiment will be described with reference to FIGS. 11 to 13. This embodiment differs from the first embodiment in that the condenser in the heat pump cycle 10 of the vehicle air conditioner 1 is configured of a coolant-refrigerant heat exchanger 23.

Figure 11:
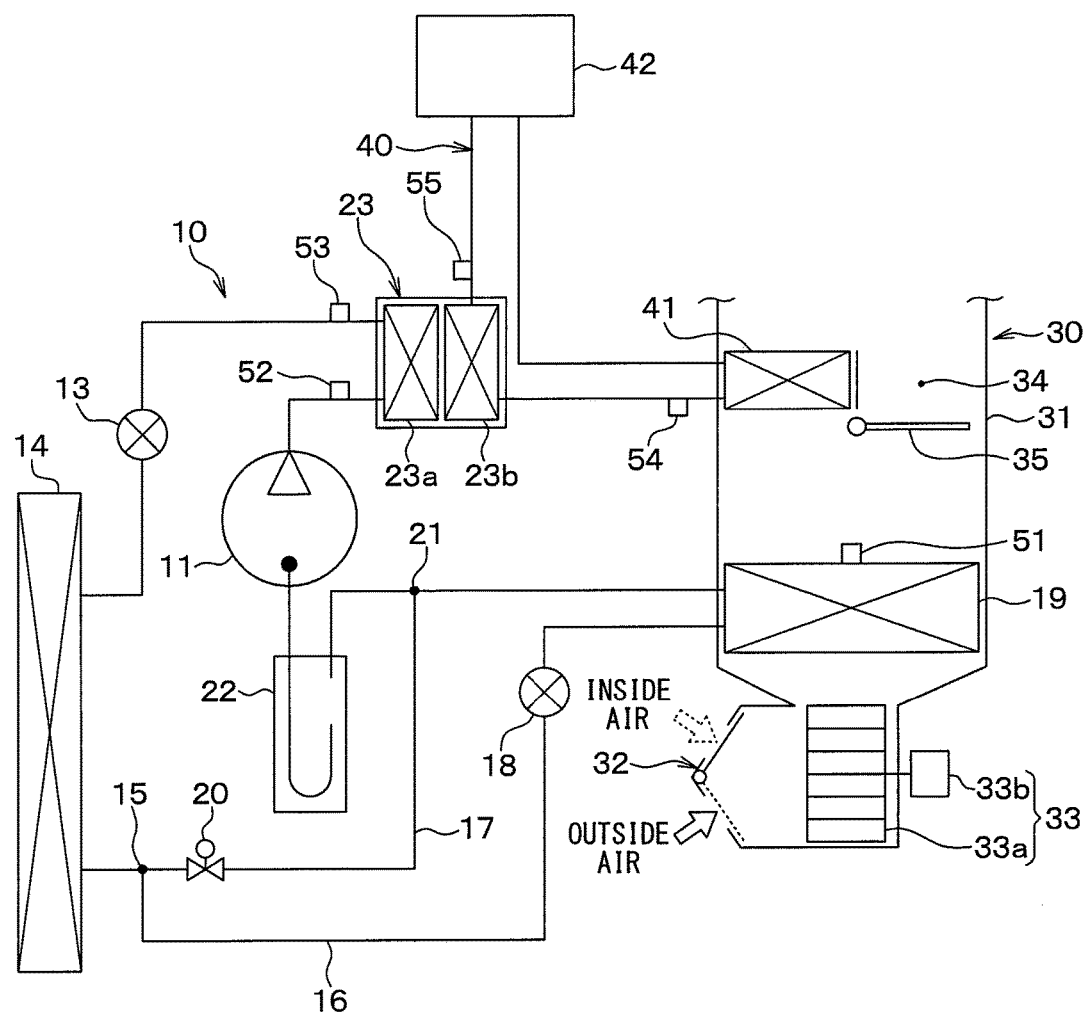
FIG. 11 is a schematic configuration diagram of a vehicle air conditioner according to a second embodiment.

As shown in FIG. 11, in the heat pump cycle 10 of this embodiment, the coolant-refrigerant heat exchanger 23 is connected to a side of the refrigerant discharge port of the compressor 11. The coolant-refrigerant heat exchanger 23 is a heat exchanger that exchanges heat between the high-pressure refrigerant discharged from the compressor 11 and the coolant in the internal combustion engine 42.

In this embodiment, the coolant in the internal combustion engine 42 corresponds to a heating medium for heating the ventilation air to be blown into the vehicle interior as the space to be air-conditioned. Therefore, in this embodiment, the coolant-refrigerant heat exchanger 23 serves as a condenser that exchanges heat between the high-pressure refrigerant discharged from the compressor 11 and the coolant.

The coolant-refrigerant heat exchanger 23 in this embodiment has a refrigerant-side passage 23a through which the high-pressure refrigerant discharged from the compressor 11 circulates and a coolant-side passage 23b through which the coolant having passed through the internal combustion engine 42 configuring the heating source circulates.

The refrigerant-side passage 23a is provided between the compressor 11 and the first expansion valve 13 in the heat pump cycle 10. Specifically, the refrigerant-side passage 23a has its refrigerant inlet side connected to the refrigerant discharge port side of the compressor 11 and its refrigerant outlet side connected to the refrigerant inlet side of the first expansion valve 13.

The coolant side passage 23b is provided between the internal combustion engine 42 and the heater core 41 in the hot-water circuit 40. Specifically, the coolant side passage 23b has its coolant inlet side connected to the coolant outlet side of the internal combustion engine 42 and its coolant outlet side connected to the coolant inlet side of the heater core 41.

The hot-water circuit 40 in this embodiment is provided with a fourth temperature sensor 55 that detects the temperature of the coolant (i.e., the temperature of the heating medium) flowing into the coolant-refrigerant heat exchanger 23. For convenience of explanation, the temperature of the coolant flowing into the coolant-refrigerant heat exchanger 23 is referred to as a coolant temperature Twe.

Figure 12:
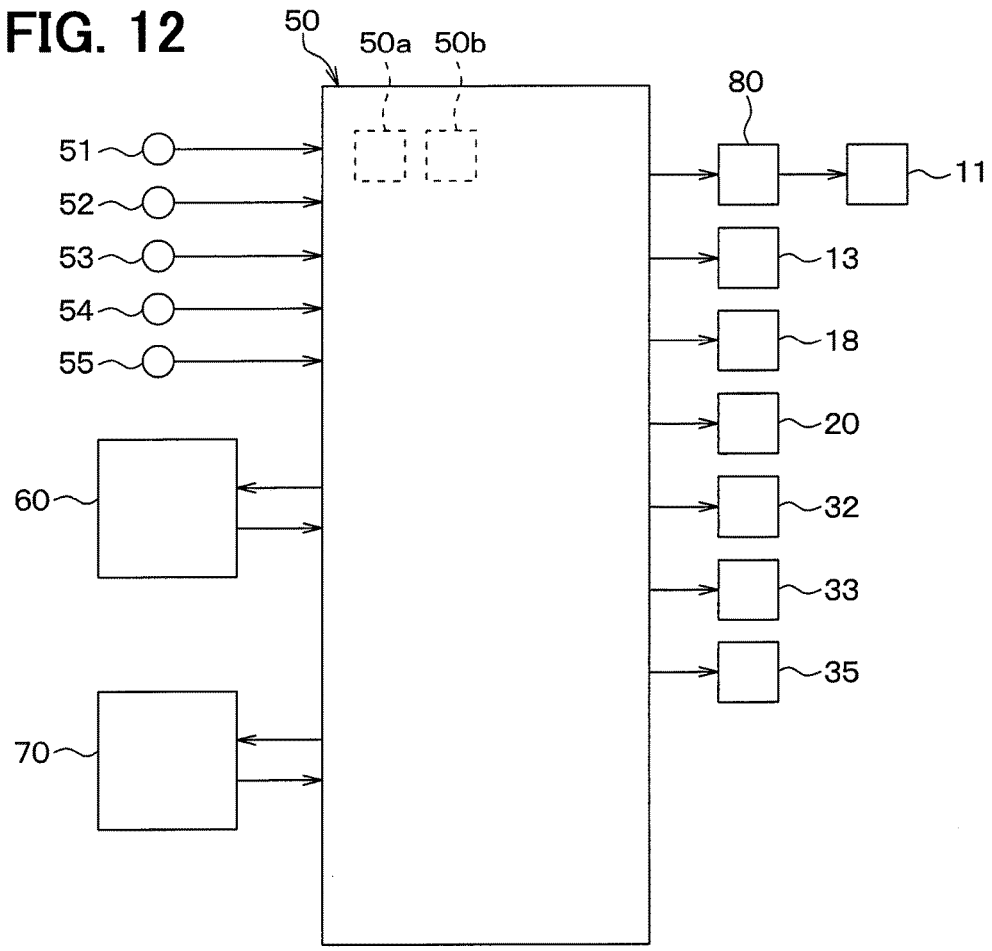
FIG. 12 is a block diagram of an air-conditioning controller of the vehicle air conditioner according to the second embodiment.

As shown in FIG. 12, the fourth temperature sensor 55 is connected to the air-conditioning controller 50. The air-conditioning controller 50 is configured to be capable of reading a detected value by the fourth temperature sensor 55.

In the interior air-conditioning unit 30 of this embodiment, the interior evaporator 19 and the heater core 41 are disposed in the air-conditioning case 31, and the coolant-refrigerant heat exchanger 23 is disposed outside the air-conditioning case 31.

The structures of other components in this embodiment are the same as those in the first embodiment. In the following, the control processing in the air-heating mode of this embodiment will be described with reference to FIG. 13. The control routine shown in FIG. 13 indicates the processing contents performed when the air-conditioning controller 50 determines the operation mode to be the air-heating mode.

Figure 13:
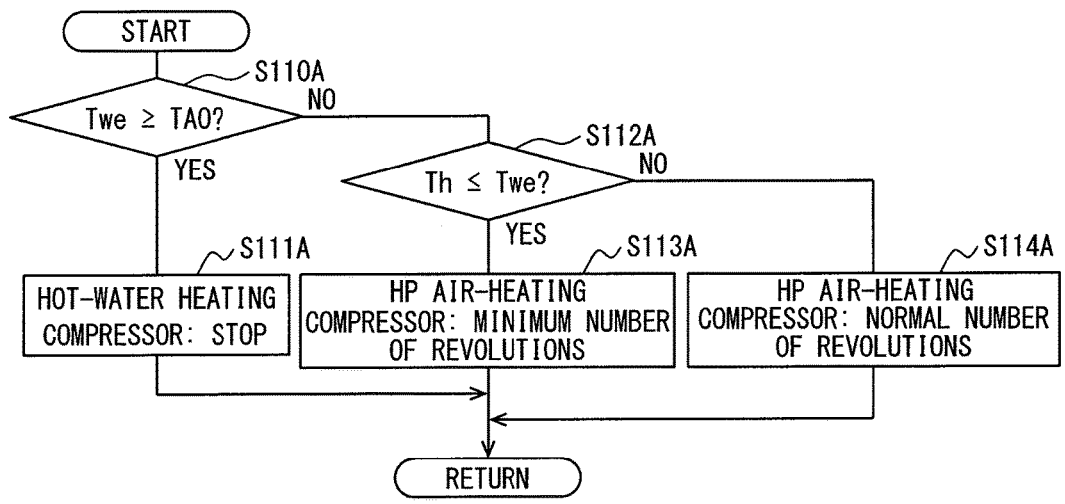
FIG. 13 is a flowchart showing control processing in the air-heating mode, executed by the air-conditioning controller according to the second embodiment.

As shown in FIG. 13, first, the air-conditioning controller 50 determines whether or not the coolant temperature Twe detected by the fourth temperature sensor 55 is equal to or higher than the target air outlet temperature TAO (S110A). As a result, the air-heating of the vehicle interior can be performed by hot-water heating using the internal combustion engine 42 when the coolant temperature Twe is determined to be equal to or higher than the target air outlet temperature TAO. For this reason, the air-conditioning controller 50 determines the number of revolutions of the compressor 11 to be zero when the coolant temperature Twe is determined to be equal to or higher than the target air outlet temperature TAO. That is, when the vehicle air conditioner satisfies the condition in which the coolant temperature Twe is equal to or higher than the target air outlet temperature TAO, the air-conditioning controller 50 stops the operation of the compressor 11 and determines that the hot-water heating is performed to heat the ventilation air using the internal combustion engine 42 as a heat source (S111A).

Meanwhile, the air-heating of the vehicle interior cannot be performed sufficiently in the hot-water heating using the internal combustion engine 42, when the coolant temperature Twe is determined to be lower than the target air outlet temperature TAO. Thus, when the coolant temperature Twe is determined to be lower than the target air outlet temperature TAO, the air-conditioning controller 50 operates the compressor 11 and thereby switches the air conditioner to the HP air-heating in which the coolant is heated by the refrigerant circulating through the coolant-refrigerant heat exchanger 23.

At start-up of the heat pump cycle 10, the temperature of the refrigerant in the cycle is occasionally lower than the coolant temperature Twe. When the compressor 11 is operated while the temperature of the refrigerant in the cycle is lower than the coolant temperature Twe, the refrigerant having a lower temperature than the coolant temperature Twe circulates through the cycle. At this time, the refrigerant having the lower temperature than the coolant temperature Twe continues to flow into the coolant-refrigerant heat exchanger 23. Thus, in the coolant-refrigerant heat exchanger 23, the refrigerant flowing through the coolant-refrigerant heat exchanger 23 continues to absorb heat from the coolant over a period of time until the discharge refrigerant temperature Th becomes higher than the coolant temperature Twe. In this case, the temperature of the coolant flowing into the heater core 41 decreases, so that the blowing air temperature TAV might be decreased.

This embodiment performs the processing for decreasing the amount of heat exchange between the high-pressure refrigerant and the coolant in the coolant-refrigerant heat exchanger 23, if the vehicle air conditioner satisfies the condition in which the discharge refrigerant temperature Th is equal to or lower than the coolant temperature Twe when switching from the hot-water heating to the HP air-heating.

Specifically, as shown in FIG. 13, the air-conditioning controller 50 determines whether or not the discharge refrigerant temperature Th is equal to or lower than the coolant temperature Twe (S112A). As a result, when the discharge refrigerant temperature Th is determined to be equal to or lower than the coolant temperature Twe, the air-conditioning controller 50 determines the number of revolutions of the compressor 11 to be set at the minimum number of revolutions (S113A).

In this way, by determining the number of revolutions of the compressor 11 to be set at the minimum number of revolutions, the flow rate of the refrigerant flowing into the coolant-refrigerant heat exchanger 23 is decreased. Thus, the amount of heat absorbed in the coolant of the coolant-refrigerant heat exchanger 23 is decreased, thereby making it possible to suppress the decrease in the temperature of the coolant flowing into the heater core 41. As a result, the decrease in the blowing air temperature TAV can be suppressed.

Meanwhile, when the discharge refrigerant temperature Th is determined to exceed the coolant temperature Twe in the determination processing at the step S112A, the high-pressure refrigerant never absorbs heat from the coolant in the coolant-refrigerant heat exchanger 23. Thus, when the discharge refrigerant temperature Th is determined to exceed the coolant temperature Twe in the determination processing at step S112A, the air-conditioning controller 50 determines the number of revolutions of the compressor 11 to be set at the normal number of revolutions (S114A).

Specifically, in the processing at step S114A, a target pressure Phd of the high-pressure refrigerant pressure Ph is determined with reference to the control map pre-stored in the storage unit, based on the target air outlet temperature TAO and the high-pressure refrigerant pressure Ph detected by the refrigerant pressure sensor 53. In the processing at step S114A, the number of revolutions of the compressor 11 is determined such that the high-pressure refrigerant pressure Ph approaches the target pressure Phd based on a deviation between the target pressure Phd and the high-pressure refrigerant pressure Ph.

The other control processing is the same as that in the first embodiment. The vehicle air conditioner 1 of this embodiment is configured to decrease the amount of heat exchange between the refrigerant and the coolant in the coolant-refrigerant heat exchanger 23 if the air conditioner satisfies the condition in which the discharge refrigerant temperature Th is equal to or lower than the coolant temperature Twe when performing the HP air-heating.

Accordingly, the high-pressure refrigerant flowing through the coolant-refrigerant heat exchanger 23 can be prevented from absorbing heat from the coolant. Thus, the decrease in the blowing air temperature TAV of the air to be blown into the vehicle interior can be suppressed when switching from the hot-water heating using a heat source other than the heat pump cycle 10 to the HP air-heating using the high-pressure refrigerant in the heat pump cycle 10. Consequently, the comfort for users who use the vehicle air conditioner 1 can be ensured.

The vehicle air conditioner in this embodiment is configured to decrease the amount of heat exchange between the high-pressure refrigerant and the coolant in the coolant-refrigerant heat exchanger 23 by decreasing the number of revolutions of the compressor 11, when the discharge refrigerant temperature Th is equal to or lower than the coolant temperature Twe. Thus, the power consumption in the compressor 11 can be reduced while suppressing unnecessary heat exchange between the high-pressure refrigerant and the coolant in the coolant-refrigerant heat exchanger 23.

The vehicle air conditioner 1 in this embodiment is configured to increase the amount of heat exchange between the refrigerant and the coolant in the coolant-refrigerant heat exchanger 23 if the discharge refrigerant temperature Th exceeds the coolant temperature Twe when performing the HP air-heating. Thus, the blowing air temperature TAV of the air to be blown into the vehicle interior during the HP air-heating can approach the target air outlet temperature TAO.

Like this embodiment, in the HP air-heating, the number of revolutions of the compressor 11 is desirably set at the minimum number of revolutions when the vehicle air conditioner satisfies the condition in which the discharge refrigerant temperature Th is equal to or lower than the coolant temperature Twe, but is not limited thereto.

When the vehicle air conditioner satisfies the condition in which the discharge refrigerant temperature Th is equal to or lower than the coolant temperature Twe in the HP air-heating, the number of revolutions of the compressor 11 may be set lower than the normal number of revolutions of the compressor 11 exhibited when the discharge refrigerant temperature Th exceeds the coolant temperature Twe. For example, when the discharge refrigerant temperature Th is equal to or lower than the coolant temperature Twe in the HP air-heating, the number of revolutions of the compressor 11 may be set at the number of revolutions obtained by subtracting a predetermined value from the normal number of revolutions of the compressor 11.

In the above description, whether or not the discharge refrigerant temperature Th is equal to or lower than the coolant temperature Twe is determined by comparing the actual discharge refrigerant temperature Th with the coolant temperature Twe by way of example, but is not limited thereto. The discharge refrigerant temperature Th becomes a temperature close to the temperature of ambient air (for example, outside air) at start-up of the heat pump cycle 10. Thus, for example, the air-conditioning controller 50 may determine whether or not the vehicle air conditioner satisfies the condition in which the discharge refrigerant temperature Th is equal to or lower than the coolant temperature Twe, by comparing the outside air temperature with the coolant temperature Twe.

Third Embodiment

Next, a third embodiment will be described with reference to FIGS. 14 to 19. This embodiment differs from the first embodiment in that switching can be performed between the refrigerant passage for allowing the refrigerant to flow to the interior condenser 12 and the refrigerant passage for allowing the refrigerant to flow while bypassing the interior condenser 12.

Figure 14:
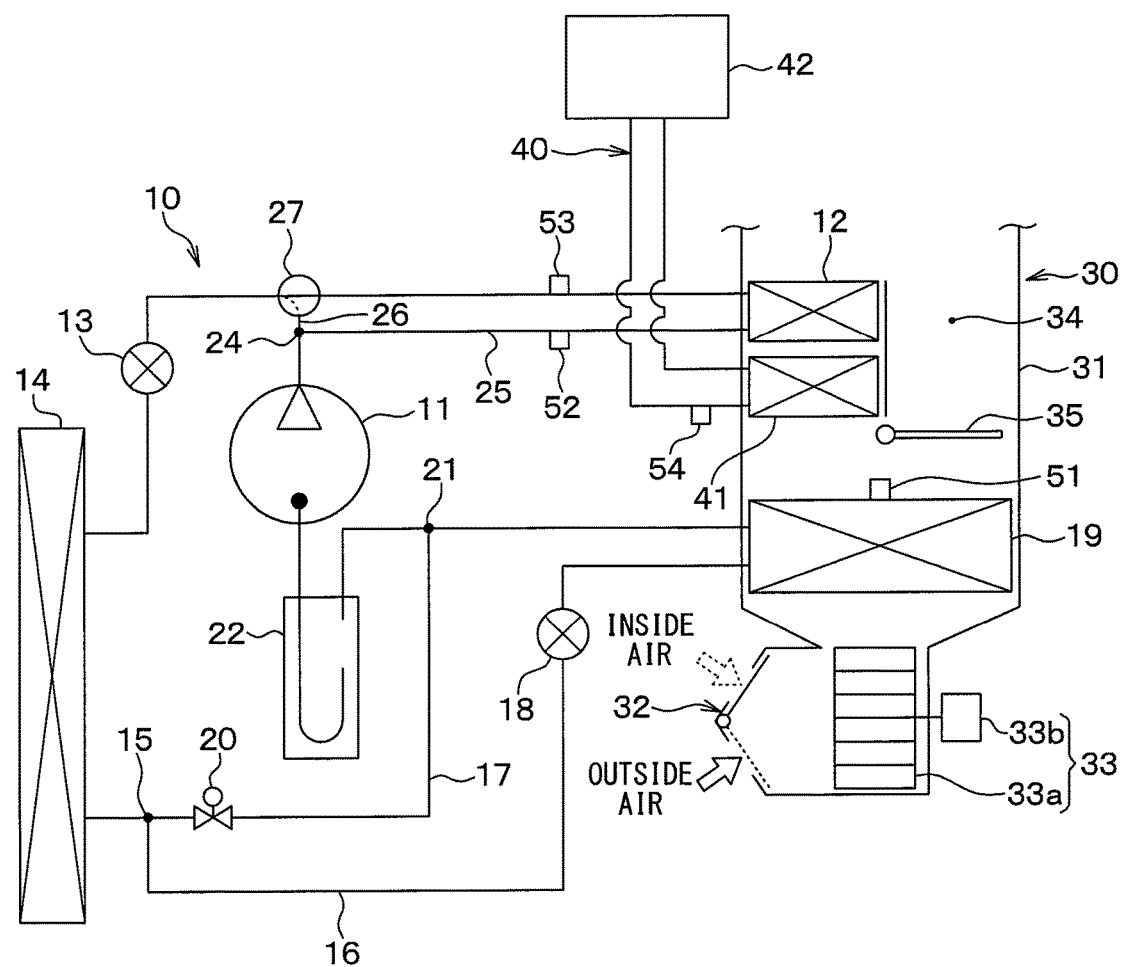
FIG. 14 is a schematic configuration diagram of a vehicle air conditioner according to a third embodiment.

As shown in FIG. 14, in the heat pump cycle 10 of this embodiment, a high-pressure side branch portion 24 is provided on the side of the refrigerant discharge port of the compressor 11. The high-pressure side branch portion 24 is a branch portion that branches the flow of the refrigerant discharged from the compressor 11. The high-pressure side branch portion 24 is configured of a three-way joint that is of the same type as the low-pressure side branch portion 15.

The high-pressure side branch portion 24 has one refrigerant outflow port thereof connected to a high-pressure refrigerant passage 25 and the other refrigerant outflow port thereof connected to a high-pressure bypass passage 26. The high-pressure refrigerant passage 25 is a refrigerant passage through which the high-pressure refrigerant discharged from the compressor 11 is guided to the first expansion valve 13 via the interior condenser 12. The high-pressure bypass passage 26 is a refrigerant passage through which the high-pressure refrigerant discharged from the compressor 11 is guided to the first expansion valve 13 while bypassing the interior condenser 12.

A high-pressure side switching valve 27 is provided on the refrigerant outlet side of the interior condenser 12. The high-pressure side switching valve 27 serves as a merging portion between the high-pressure refrigerant passage 25 and the high-pressure bypass passage 26. The high-pressure side switching valve 27 is a passage switching portion that switches the refrigerant passage for the high-pressure refrigerant discharged from the compressor 11 to either of the high-pressure refrigerant passage 25 and the high-pressure bypass passage 26.

Figure 15:
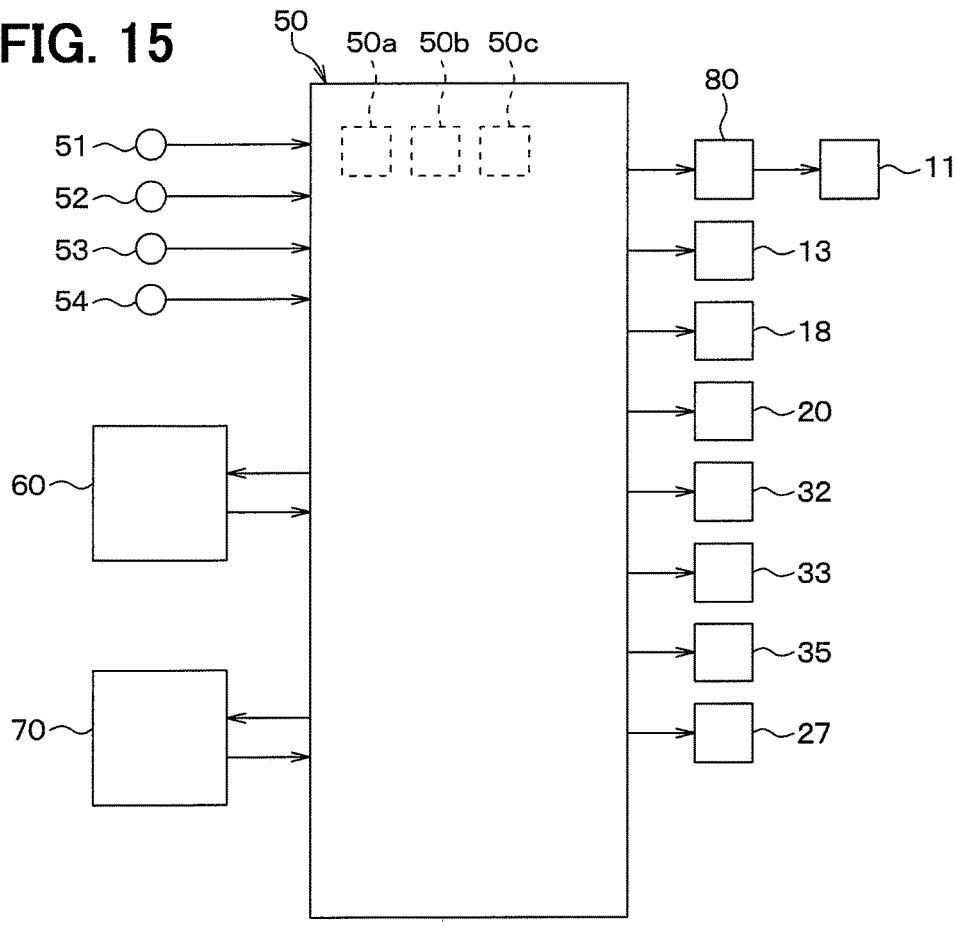
FIG. 15 is a block diagram of an air-conditioning controller of the vehicle air conditioner according to the third embodiment.

As shown in FIG. 15, the high-pressure side switching valve 27 in this embodiment is connected to the air-conditioning controller 50. The high-pressure side switching valve 27 in this embodiment is configured of an electric flow-path switching valve that is controlled by a control signal output from the air-conditioning controller 50.

The high-pressure side switching valve 27 in this embodiment is configured to be capable of adjusting the flow rate of the high-pressure refrigerant flowing into the interior condenser 12 by a control signal output from the air-conditioning controller 50. The high-pressure side switching valve 27 changes the flow rate of the high-pressure refrigerant flowing into the interior condenser 12, thereby making it possible to adjust the amount of heat exchange between the high-pressure refrigerant and the ventilation air in the interior condenser 12. That is, the high-pressure side switching valve 27 in this embodiment is configured to be capable of adjusting the ratio of the flow rate of the high-pressure refrigerant flowing to the interior condenser 12 to that of the high-pressure refrigerant flowing to the high-pressure bypass passage 26. Therefore, in this embodiment, the high-pressure bypass passage 26 and the high-pressure side switching valve 27 each configure a refrigerant flow-rate adjustment portion that adjusts the flow rate of the high-pressure refrigerant flowing into the interior condenser 12 and thereby as a heat-exchange adjustment portion.

The air-conditioning controller 50 controls the high-pressure side switching valve 27 such that the refrigerant discharged from the compressor 11 flows to the high-pressure bypass passage 26 in the air-cooling mode or the like of not exchanging heat between the high-pressure refrigerant and the ventilation air in the interior condenser 12.

The air-conditioning controller 50 controls the high-pressure side switching valve 27 such that the refrigerant discharged from the compressor 11 flows to the interior condenser 12 via the high-pressure refrigerant passage 25 in the operation mode of exchanging heat between the high-pressure refrigerant and the ventilation air in the interior condenser 12.

The control units integrated in the air-conditioning controller 50 of this embodiment include, in addition to the operation-mode switching unit 50a and the compressor control unit 50b, a switching control unit 50c for controlling the high-pressure side switching valve 27. In this embodiment, the switching control unit 50c configures a heat-exchange control unit that controls the high-pressure side switching valve 27 serving as the heat-exchange adjustment portion.

The structures of other components in this embodiment are the same as those in the first embodiment. In the following, the control processing in the air-heating mode of this embodiment will be described with reference to FIG. 16. The control routine shown in FIG. 16 indicates the processing contents performed when the air-conditioning controller 50 determines the operation mode to be the air-heating mode.

Figure 16:
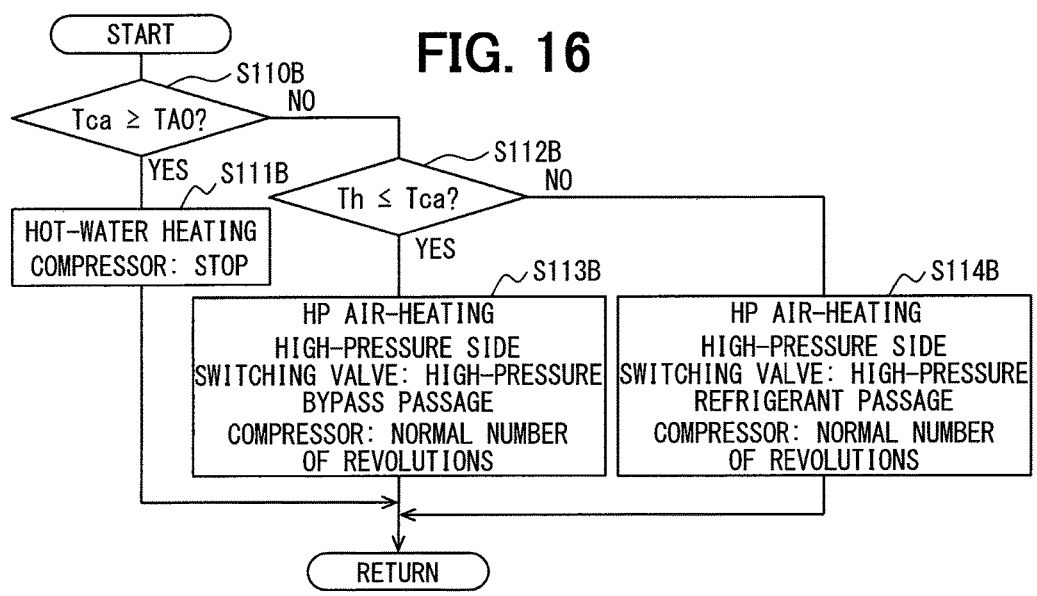
FIG. 16 is a flowchart showing control processing in the air-heating mode, executed by the air-conditioning controller according to the third embodiment.
Figure 17:
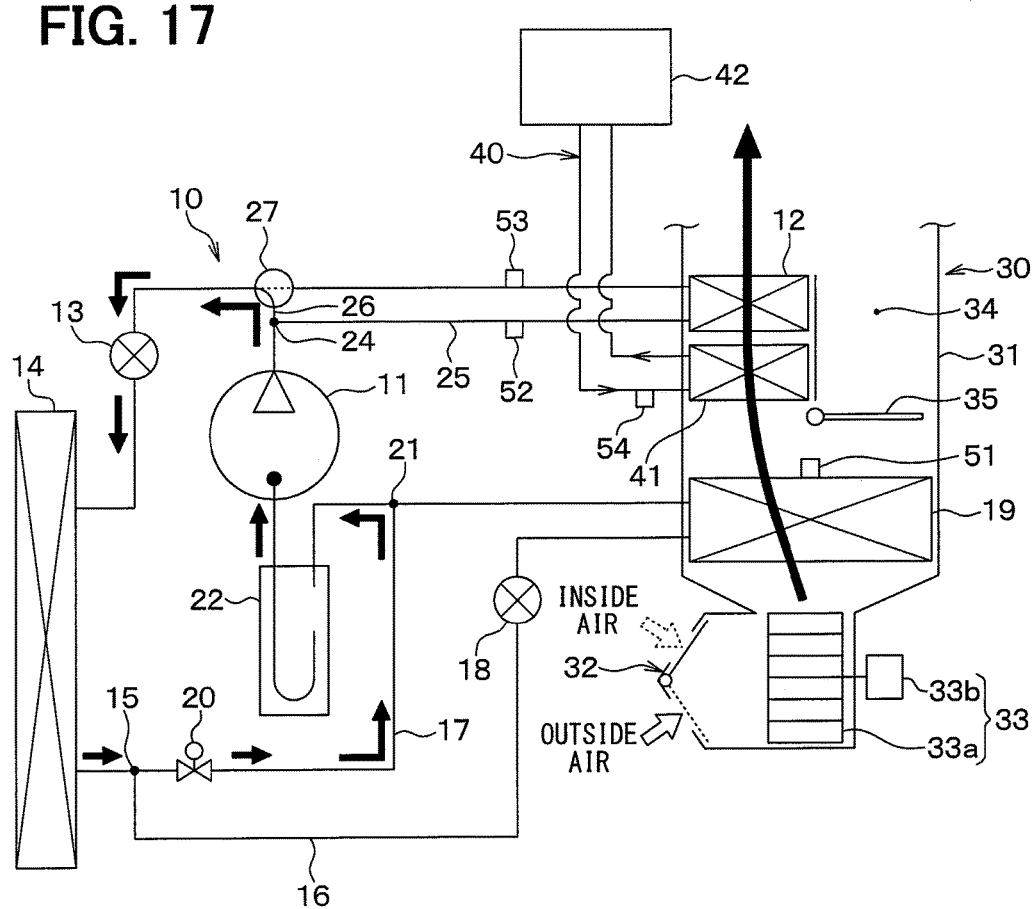
FIG. 17 is an exemplary configuration diagram showing the flow of a refrigerant when a discharge refrigerant temperature is low in the HP air-heating of the vehicle air conditioner according to the third embodiment.
Figure 18:
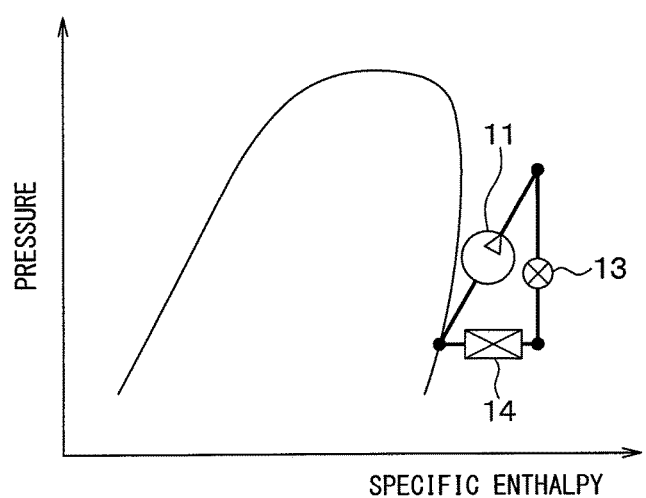
FIG. 18 is a Mollier chart showing the state of a refrigerant when the discharge refrigerant temperature is low in the HP air-heating of the vehicle air conditioner according to the third embodiment.
Figure 19:
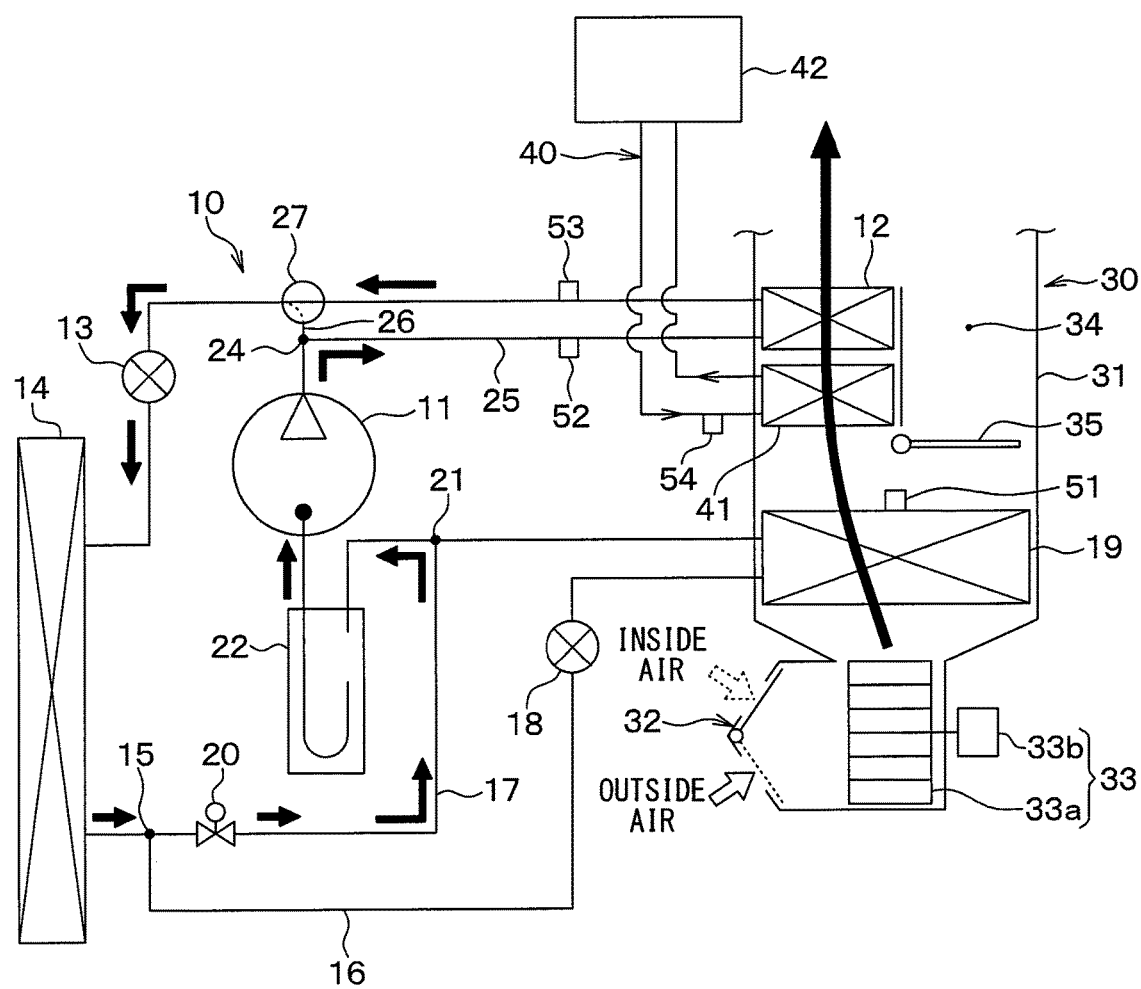
FIG. 19 is an exemplary configuration diagram showing the flow of a refrigerant when the discharge refrigerant temperature is high in the HP air-heating of the vehicle air conditioner according to the third embodiment.

As shown in FIG. 16, the air-conditioning controller 50 calculates a heater-core blowing temperature Tca from the heater-core water temperature Twh detected by the third temperature sensor 54, and determines whether or not the calculated heater-core blowing temperature Tca is equal to or higher than the target air outlet temperature TAO (S110B). As a result, the air-conditioning controller 50 determines the number of revolutions of the compressor 11 to be zero when the heater-core blowing temperature Tca is determined to be equal to or higher than the target air outlet temperature TAO. That is, when the vehicle air conditioner satisfies the condition in which the heater-core blowing temperature Tca is equal to or higher than the target air outlet temperature TAO, the air-conditioning controller 50 stops the compressor 11 and determines the operation mode to be hot-water heating in which the ventilation air is heated using the internal combustion engine 42 as a heat source (S111B).

Meanwhile, when the heater-core blowing temperature Tca is determined to lower than the target air outlet temperature TAO, the air-conditioning controller 50 operates the compressor 11 and thereby switches the air conditioner to the HP air-heating in which the ventilation air is heated by the refrigerant circulating through the interior condenser 12.

The air-conditioning controller 50 in this embodiment executes the processing for decreasing the amount of heat exchange between the high-pressure refrigerant and the ventilation air in the interior condenser 12, if the air conditioner satisfies the condition in which the discharge refrigerant temperature Th is equal to or lower than the heater-core blowing temperature Tca when switching from the hot-water heating to the HP air-heating.

Specifically, the air-conditioning controller 50 determines whether or not the discharge refrigerant temperature Th is equal to or lower than the heater-core blowing temperature Tca (S112B). As a result, when the discharge refrigerant temperature Th is determined to be equal to or lower than the heater-core blowing temperature Tca, the air-conditioning controller 50 controls the high-pressure side switching valve 27 such that the refrigerant discharged from the compressor 11 flows to the high-pressure bypass passage 26 (S113B). At this time, regarding the compressor 11, the number of revolutions of the compressor 11 is determined to be set at the normal number of revolutions such that the high-pressure refrigerant pressure Ph approaches the target pressure Phd.

In this way, the refrigerant passage for the refrigerant discharged from the compressor 11 is set in the high-pressure bypass passage 26, thereby preventing the refrigerant from flowing into the interior condenser 12. Thus, there is no heat exchange between the high-pressure refrigerant and the ventilation air in the interior condenser 12, thereby making it possible to suppress a decrease in the blowing air temperature TAV.

Meanwhile, when the discharge refrigerant temperature Th is determined to exceed the heater-core blowing temperature Tca in the determination processing at the step S112B, the high-pressure refrigerant never absorbs heat from the ventilation air in the interior condenser 12. For this reason, when the discharge refrigerant temperature Th is determined to exceed the heater-core blowing temperature Tca, the air-conditioning controller 50 controls the high-pressure side switching valve 27 such that the refrigerant discharged from the compressor 11 flows to the high-pressure refrigerant passage 25 (S114B). At this time, regarding the compressor 11, the number of revolutions of the compressor 11 is determined to be set at the normal number of revolutions such that the high-pressure refrigerant pressure Ph approaches the target pressure Phd.

The vehicle air conditioner 1 in this embodiment is controlled as mentioned above. Thus, the vehicle air conditioner 1 operates in the HP air-heating as follows.

In the HP air-heating, when the vehicle air conditioner satisfies the condition in which the heater-core blowing temperature Tca is lower than the target air outlet temperature TAO, the air-conditioning controller 50 operates the compressor 11 and thereby switches from the hot-water heating to the HP air-heating.

At this time, when the discharge refrigerant temperature Th is equal to or lower than the heater-core blowing temperature Tca, the air-conditioning controller 50 sets the refrigerant passage for the high-pressure refrigerant discharged from the compressor 11 in the high-pressure bypass passage 26. Thus, as indicated by the arrows in FIG. 17, the refrigerant discharged from the compressor 11 flows through the first expansion valve 13, the exterior heat exchanger 14, and the accumulator 22 in this order, and then is drawn into the compressor 11 again. As shown in the Mollier chart of FIG. 18, the heat pump cycle 10 transforms a workload of the compressor 11 into a hot-gas operation that dissipate heat in the exterior heat exchanger 14. In this way, this embodiment has a cycle configuration in which the interior condenser 12 does not exchange heat between the refrigerant and ventilation air, when the discharge refrigerant temperature Th is equal to or lower than the heater-core blowing temperature Tca.

Meanwhile, when the discharge refrigerant temperature Th exceeds the heater-core blowing temperature Tca, the air-conditioning controller 50 sets the refrigerant passage for the high-pressure refrigerant discharged from the compressor 11 in the high-pressure refrigerant passage 25. Thus, as indicated by the arrows in FIG. 19, the refrigerant discharged from the compressor 11 flows through the interior condenser 12, the first expansion valve 13, the exterior heat exchanger 14, and the accumulator 22 in this order, and then is drawn into the compressor 11 again. In this case, the refrigerant flowing into the interior condenser 12 dissipates heat into the ventilation air. As a result, the ventilation air is heated in the interior condenser 12 such that its temperature approaches the target air outlet temperature TAO.

The vehicle air conditioner 1 in this embodiment, mentioned above, is configured to decrease the amount of heat exchange between the refrigerant and the ventilation air in the interior condenser 12, if the vehicle air conditioner satisfies the condition in which the discharge refrigerant temperature Th is equal to or lower than the heater-core blowing temperature Tca when performing the HP air-heating.

Thus, the amount of heat absorbed from the ventilation air in the interior condenser 12 is suppressed, thereby making it possible to suppress a decrease in the blowing air temperature TAV of the air from the interior air-conditioning unit 30. Consequently, the comfort for users who use the vehicle air conditioner 1 can be ensured.

In particular, in this embodiment, if the condition in which the discharge refrigerant temperature Th is equal to or lower than the heater-core blowing temperature Tca when performing the HP air-heating, the vehicle air conditioner 1 is configured to cause the refrigerant to flow while bypassing the interior condenser 12. In this way, the heat exchange between the high-pressure refrigerant and the coolant in the interior condenser 12 is prevented. Thus, this embodiment prevents unnecessary heat exchange between the high-pressure refrigerant and the ventilation air in the interior condenser 12, thereby making it possible to effectively suppress a decrease in the blowing air temperature TAV.

The vehicle air conditioner in this embodiment is configured to cause the high-pressure refrigerant to flow through the interior condenser 12, if the discharge refrigerant temperature Th exceeds the heater-core blowing temperature Tca when performing the HP air-heating. Thus, the blowing air temperature TAV of the air to be blown into the vehicle interior during the HP air-heating can approach the target air outlet temperature TAO.

This embodiment exemplifies the heat pump cycle 10 including the interior condenser 12, but is not limited thereto. For example, the heat pump cycle 10 including the coolant-refrigerant heat exchanger 23, mentioned in the second embodiment, may be configured to switch between one refrigerant passage for causing the refrigerant to flow to the coolant-refrigerant heat exchanger 23 and another refrigerant passage for causing the refrigerant to flow while bypassing the coolant-refrigerant heat exchanger 23. In this case, if the vehicle air conditioner satisfies the condition in which the discharge refrigerant temperature Th is equal to or lower than the coolant temperature Twe when performing the HP air-heating, the vehicle air conditioner 1 only needs to be configured to cause the refrigerant to flow while bypassing the coolant-refrigerant heat exchanger 23, thereby preventing the heat exchange between the high-pressure refrigerant and the coolant in the coolant-refrigerant heat exchanger 23.

This embodiment has explained the example in which the high-pressure side switching valve 27 is provided at the merging portion between the high-pressure refrigerant passage 25 and the high-pressure bypass passage 26, but is not limited thereto. For example, the high-pressure side switching valve 27 may be provided at a branch portion between the high-pressure refrigerant passage 25 and the high-pressure bypass passage 26.

Fourth Embodiment

Next, a fourth embodiment will be described with reference to FIGS. 20 to 24. This embodiment differs from the first embodiment in that air mix doors 35A and 35B are provided corresponding to the heater core 41 and the interior condenser 12, respectively.

Figure 20:
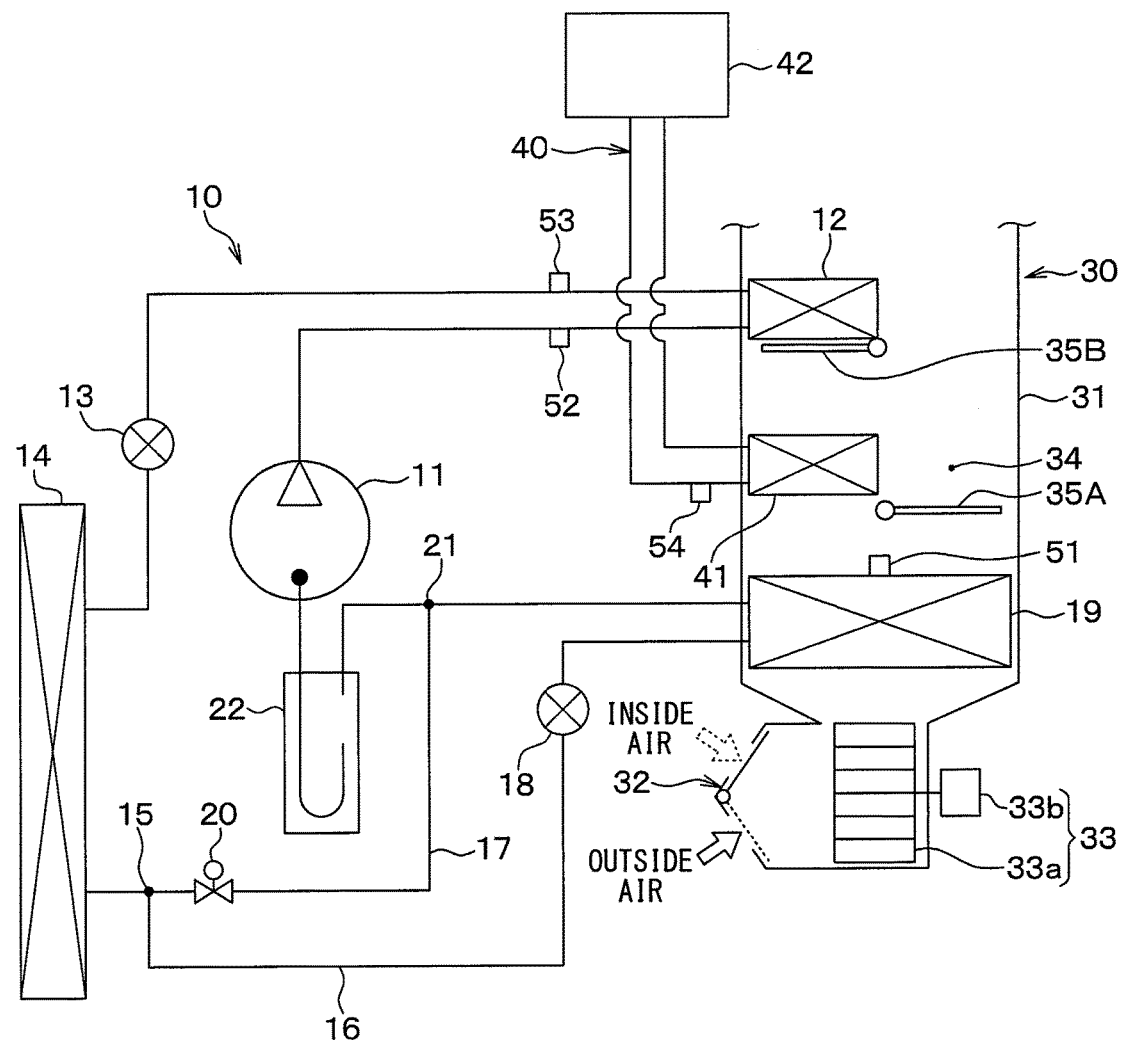
FIG. 20 is a schematic configuration diagram of a vehicle air conditioner according to a fourth embodiment.

As shown in FIG. 20, in the interior air-conditioning unit 30 of this embodiment, the first air mix door 35A is disposed on the downstream side of the air flow with respect to the interior evaporator 19 and on the upstream side of the air flow with respect to the heater core 41 within the air-conditioning case 31.

The first air mix door 35A serves as a temperature adjustment portion that adjusts the temperature of the air on the downstream side of the heater core 41 by regulating the volume of the air passing through the heater core 41 and the volume of the air passing through the cold-air bypass passage 34, in the ventilation air having passed through the interior evaporator 19.

In the interior air-conditioning unit 30 of this embodiment, the second air mix door 35B is disposed on the downstream side of the air flow with respect to the heater core 41 and on the upstream side of the air flow with respect to the interior condenser 12 within the air-conditioning case 31.

The second air mix door 35B serves as a temperature adjustment portion that adjusts the temperature of the air on the downstream side of the interior condenser 12 by regulating the volume of the air passing through the interior condenser 12 and the volume of the air passing through the cold-air bypass passage 34, in the ventilation air on the downstream side of the heater core 41.

The second air mix door 35B in this embodiment is configured to be capable of adjusting the flow rate of the ventilation air flowing into the interior condenser 12. The second air mix door 35B changes the flow rate of the ventilation air flowing into the interior condenser 12, thereby making it possible to adjust the amount of heat exchange between the high-pressure refrigerant and the ventilation air in the interior condenser 12. Therefore, in this embodiment, the second air mix door 35B configures an air flow-rate adjustment portion that adjusts the flow rate of the ventilation air flowing into the interior condenser 12 and thereby as a heat-exchange adjustment portion.

Figure 21:
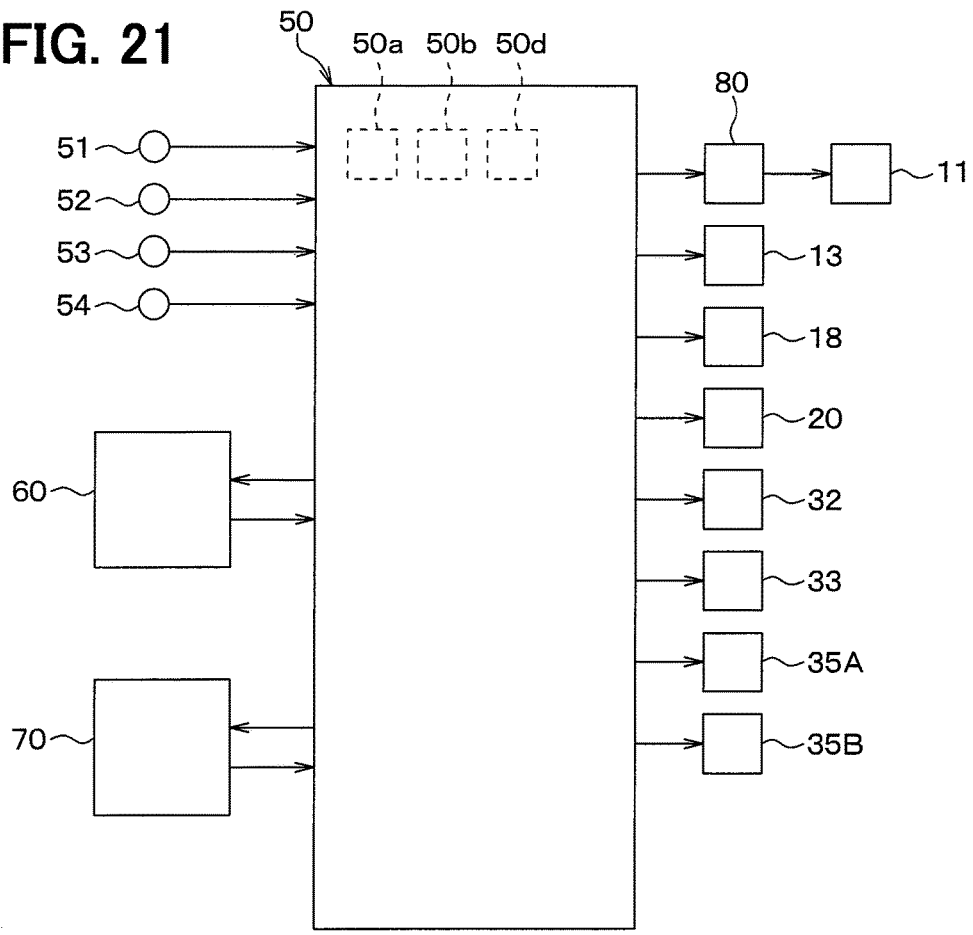
FIG. 21 is a block diagram of an air-conditioning controller of the vehicle air conditioner according to the fourth embodiment.

As shown in FIG. 21, the respective air mix doors 35A and 35B in this embodiment are connected to the air-conditioning controller 50. The respective air mix doors 35A and 35B have their operations individually controlled by control signals output from the air-conditioning controller 50.

The air-conditioning controller 50 controls the respective air mix doors 35A and 35B such that the ventilation air having passed through the interior evaporator 19 flows through the cold-air bypass passage 34 in the air-cooling mode or the like in which the ventilation air is not heated by the heater core 41 or interior condenser 12.

The air-conditioning controller 50 controls the respective air mix doors 35A and 35B such that the ventilation air having passed through the interior evaporator 19 flows through at least one of the heater core 41 and the interior condenser 12 in the operation mode of heating the ventilation air by the heater core 41 or interior condenser 12.

The control units integrated in the air-conditioning controller 50 of this embodiment include, in addition to the operation-mode switching unit 50a and the compressor control unit 50b, a door control unit 50d for controlling the respective air mix doors 35A and 35B. In this embodiment, the door control unit 50d configures a heat-exchange control unit that controls the second air mix door 35B serving as the heat-exchange adjustment portion.

The structures of other components in this embodiment are the same as those in the first embodiment. In the following, the control processing in the air-heating mode of this embodiment will be described with reference to FIG. 22. The control routine shown in FIG. 22 indicates the processing contents performed when the air-conditioning controller 50 determines the operation mode to be the air-heating mode.

Figure 22:
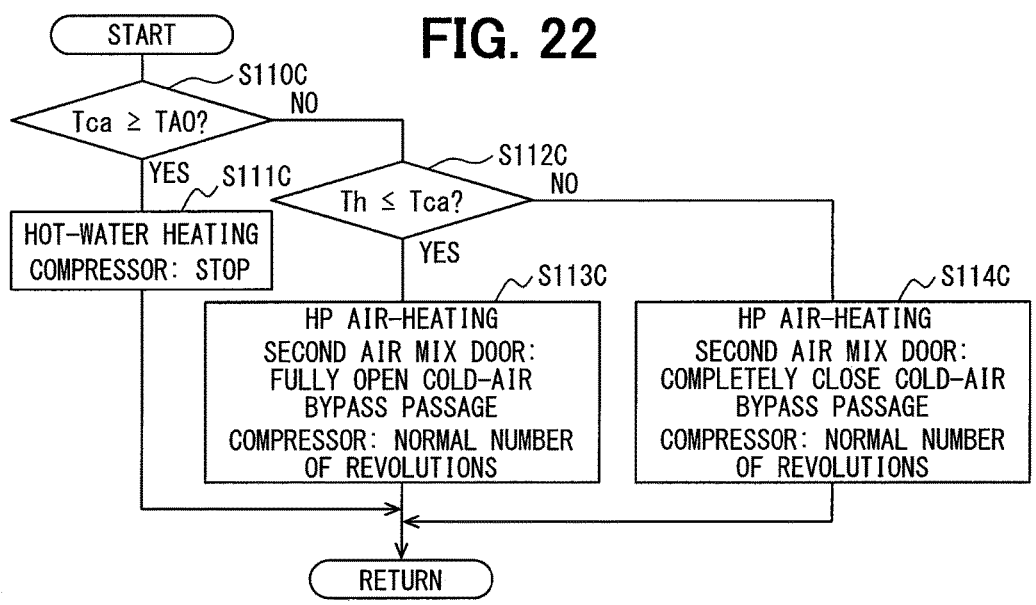
FIG. 22 is a flowchart showing control processing in the air-heating mode, executed by the air-conditioning controller according to the fourth embodiment.
Figure 23:
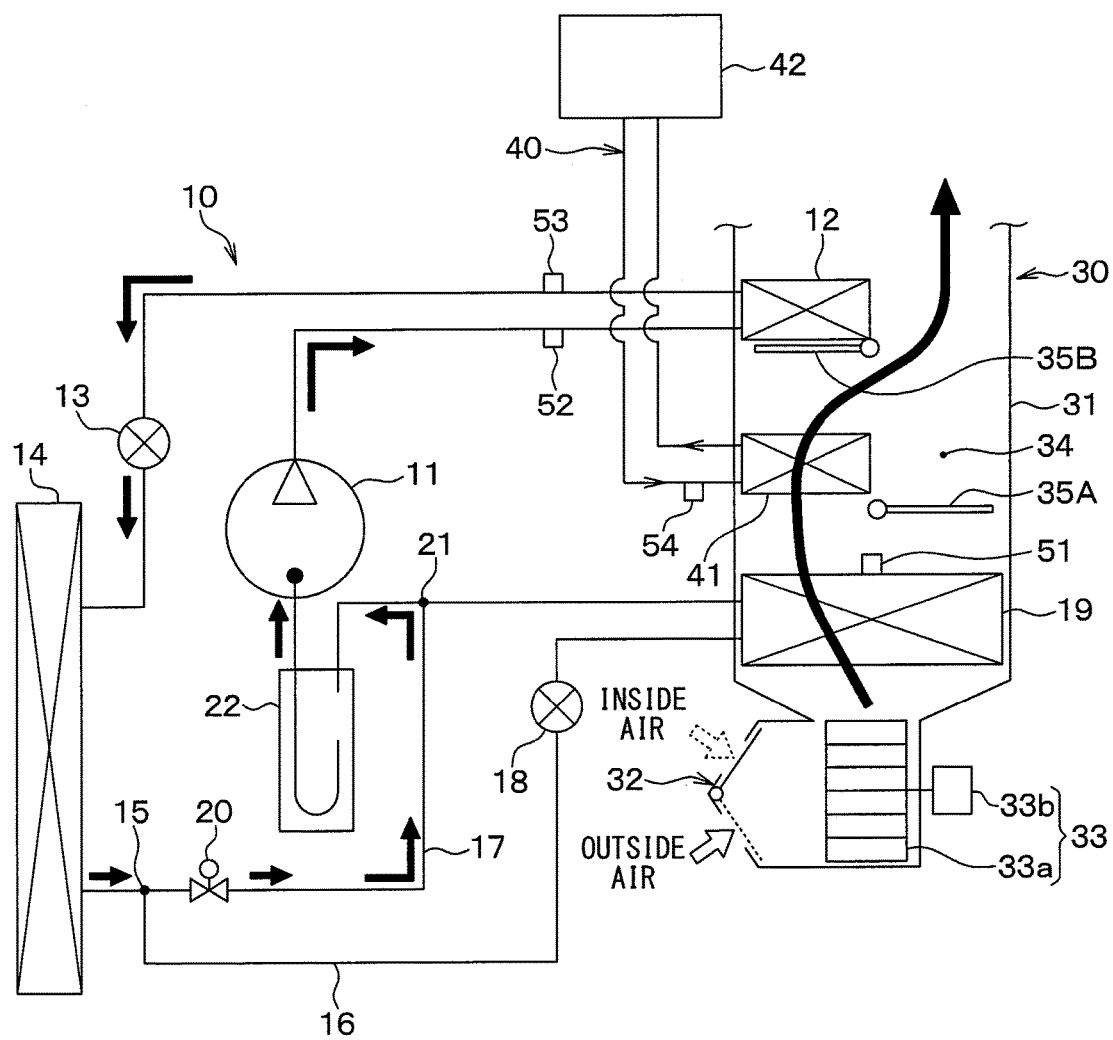
FIG. 23 is an exemplary configuration diagram showing the flow of ventilation air when the discharge refrigerant temperature is low in the HP air-heating of the vehicle air conditioner according to the fourth embodiment.
Figure 24:
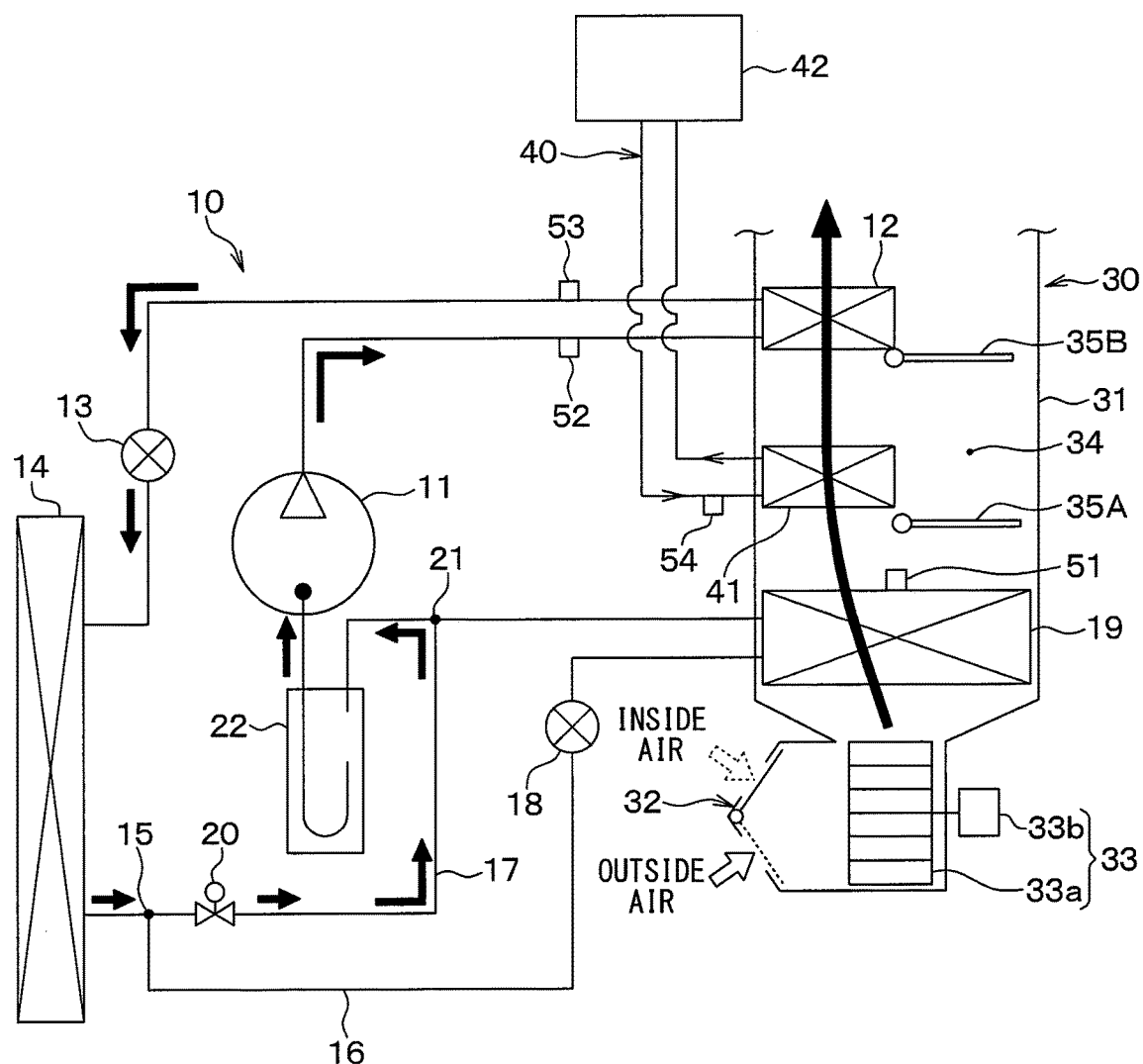
FIG. 24 is an exemplary configuration diagram showing the flow of ventilation air when the discharge refrigerant temperature is high in the HP air-heating of the vehicle air conditioner according to the fourth embodiment.

As shown in FIG. 22, the air-conditioning controller 50 calculates a heater-core blowing temperature Tca from the heater-core water temperature Twh detected by the third temperature sensor 54, and determines whether or not the calculated heater-core blowing temperature Tca is higher than the target air outlet temperature TAO (S110C). As a result, the air-conditioning controller 50 determines the number of revolutions of the compressor 11 to be zero when the heater-core blowing temperature Tca is determined to be equal to or higher than the target air outlet temperature TAO. That is, when the vehicle air conditioner satisfies a condition in which the heater-core blowing temperature Tca is higher than the target air outlet temperature TAO, the air-conditioning controller 50 stops the operation of the compressor 11 and determines the operation mode to be hot-water heating in which the ventilation air is heated using the internal combustion engine 42 as a heat source (S111C).

Meanwhile, when the heater-core blowing temperature Tca is determined to be lower than the target air outlet temperature TAO, the air-conditioning controller 50 operates the compressor 11 and thereby switches the operation mode to the HP air-heating in which the ventilation air is heated by the refrigerant flowing through the interior condenser 12.

The air-conditioning controller 50 in this embodiment executes the processing for decreasing the amount of heat exchange between the high-pressure refrigerant and the ventilation air in the interior condenser 12, if the vehicle air conditioner satisfies the condition in which the discharge refrigerant temperature Th is equal to or lower than the heater-core blowing temperature Tca when switching from the hot-water heating to the HP air-heating.

Specifically, the air-conditioning controller 50 determines whether or not the discharge refrigerant temperature Th is equal to or lower than the heater-core blowing temperature Tca (S112C). As a result, when the discharge refrigerant temperature Th is determined to be equal to or lower than the heater-core blowing temperature Tca, the air-conditioning controller 50 controls the second air mix door 35B such that the air having passed through the heater core 41 flows thorough the cold-air bypass passage 34 (S113C).

At this time, regarding the first air mix door 35A, its door opening degree is controlled such that the air having passed through the interior evaporator 19 flows through the heater core 41. Regarding the compressor 11, the number of revolutions of the compressor 11 is determined to be set at the normal number of revolutions such that the high-pressure refrigerant pressure Ph approaches the target pressure Phd.

In this way, the second air mix door 35B is set to cause the ventilation air to flow to the cold-air bypass passage 34, thereby preventing the ventilation air from flowing into the interior condenser 12. Thus, there is no heat exchange between the high-pressure refrigerant and the ventilation air in the interior condenser 12, thereby making it possible to suppress a decrease in the blowing air temperature TAV.

Meanwhile, when the discharge refrigerant temperature Th is determined to exceed the heater-core blowing temperature Tca in the determination processing at the step S112C, the high-pressure refrigerant never absorbs heat from the ventilation air in the interior condenser 12. Thus, the air-conditioning controller 50 controls the respective air mix doors 35A and 35B such that the air having passed through the interior evaporator 19 flows through both the heater core 41 and the interior condenser 12 (S114C). At this time, regarding the compressor 11, the number of revolutions of the compressor 11 is determined to be set at the normal number of revolutions such that the high-pressure refrigerant pressure Ph approaches the target pressure Phd.

The vehicle air conditioner 1 in this embodiment is controlled as mentioned above. Thus, the vehicle air conditioner 1 operates in the HP air-heating as follows.

In the HP air-heating, when the vehicle air conditioner satisfies the condition in which the heater-core blowing temperature Tca is lower than the target air outlet temperature TAO, the air-conditioning controller 50 operates the compressor 11 and switches from the hot-water heating to the HP air-heating.

At this time, when the discharge refrigerant temperature Th is equal to or lower than the heater-core blowing temperature Tca, the second air mix door 35B is set in such a position that fully opens the cold-air bypass passage 34. In this way, as indicated by the arrows in FIG. 23, the ventilation air blown from the blower 33 flows through the interior evaporator 19, the heater core 41, and the cold-air bypass passage 34 in this order, and is then blown out into the vehicle interior. At this time, the ventilation air is heated by the heater core 41 such that its temperature approaches the target air outlet temperature TAO.

Meanwhile, when the discharge refrigerant temperature Th exceeds the heater-core blowing temperature Tca, the second air mix door 35B is set in such a position that completely closes the cold-air bypass passage 34. In this way, as indicated by the arrows in FIG. 24, the ventilation air blown from the blower 33 flows through the interior evaporator 19, the heater core 41, and the interior condenser 12 in this order, and is then blown out into the vehicle interior. At this time, the ventilation air is heated by both the heater core 41 and the interior condenser 12 such that its temperature approaches the target air outlet temperature TAO.

The vehicle air conditioner 1 in this embodiment, mentioned above, is configured to decrease the amount of heat exchange between the refrigerant and the ventilation air in the interior condenser 12, if the vehicle air conditioner satisfies the condition in which the discharge refrigerant temperature Th is equal to or lower than the heater-core blowing temperature Tca when performing the HP air-heating.

Thus, the amount of heat absorbed from the ventilation air in the interior condenser 12 is suppressed, thereby making it possible to suppress a decrease in the blowing air temperature TAV of the air from the interior air-conditioning unit 30. Consequently, the comfort for users who use the vehicle air conditioner 1 can be ensured.

In particular, in this embodiment, if the vehicle air conditioner satisfies the condition in which the discharge refrigerant temperature Th is equal to or lower than the heater-core blowing temperature Tca when performing the HP air-heating, the vehicle air conditioner 1 is configured to cause the ventilation air to flow while bypassing the interior condenser 12. Thus, this embodiment prevents unnecessary heat exchange between the high-pressure refrigerant and the ventilation air in the interior condenser 12, thereby making it possible to effectively suppress a decrease in the blowing air temperature TAV.

In this embodiment, the vehicle air conditioner 1 is configured to cause the ventilation air to flow through the interior condenser 12, if the discharge refrigerant temperature Th exceeds the heater-core blowing temperature Tca when performing the HP air-heating. Thus, the blowing air temperature TAV of the air to be blown into the vehicle interior during the HP air-heating can approach the target air outlet temperature TAO.

This embodiment has explained the example in which the ventilation air flows to both the heater core 41 and the interior condenser 12 if the discharge refrigerant temperature Th exceeds the heater-core blowing temperature Tca when performing the HP air-heating. However, the present disclosure is not limited thereto. For example, when the discharge refrigerant temperature Th exceeds the heater-core blowing temperature Tca in performing the HP air-heating, the ventilation air may flow to the interior condenser 12 while bypassing the heater core 41.

This embodiment has explained the example in which the ventilation air flows while bypassing the interior condenser 12, if the vehicle air conditioner satisfies the condition in which the discharge refrigerant temperature Th is equal to or lower than the heater-core blowing temperature Tca when performing the HP air-heating.

Meanwhile, it can be considered that if the vehicle air conditioner satisfies the condition in which the discharge refrigerant temperature Th is equal to or lower than the heater-core blowing temperature Tca when performing the HP air-heating, the blowing capacity (for example, the number of revolutions) of the blower 33 is reduced, thereby decreasing the flow rate of the ventilation air flowing into the interior condenser 12.

However, by reducing the blowing capacity of the blower 33, the flow rate of the ventilation air flowing into the interior condenser 12 is decreased, resulting in a large change in the temperature of the ventilation air in the interior condenser 12. Because of this, if the vehicle air conditioner satisfies the condition in which the discharge refrigerant temperature Th is equal to or lower than the heater-core blowing temperature Tca when performing the HP air-heating, the reduction in the blowing capacity of the blower 33 might lead to a decrease in the blowing air temperature TAV of the air to be blown into the vehicle interior.

For this reason, like this embodiment, the vehicle air conditioner 1 is desirably configured to cause the ventilation air to flow while bypassing the interior condenser 12, if the vehicle air conditioner satisfies the condition in which the discharge refrigerant temperature Th is equal to or lower than the heater-core blowing temperature Tca when performing the HP air-heating.

When the blowing capacity of the blower 33 is reduced, the flow rate of the air blown into the vehicle interior is decreased. Because of this, suppose that the vehicle air conditioner satisfies the condition in which the discharge refrigerant temperature Th is equal to or lower than the heater-core blowing temperature Tca when performing the HP air-heating. In this case, even when the blowing capacity of the blower 33 is reduced, the decrease in the blowing air temperature TAV into the vehicle interior barely affects the comfort for users.

Therefore, from the perspective of suppressing the deterioration of the comfort for users, the blowing capacity of the blower 33 may be reduced if the vehicle air conditioner satisfies the condition in which the discharge refrigerant temperature Th is equal to or lower than the heater-core blowing temperature Tca when performing the HP air-heating.

Fifth Embodiment

Next, a fifth embodiment will be described with reference to FIGS. 25 to 29. This embodiment differs from the second embodiment in that a hot-water bypass passage 45 is provided with respect to the hot-water circuit 40 to cause the coolant to flow while bypassing the coolant-refrigerant heat exchanger 23.

Figure 25:
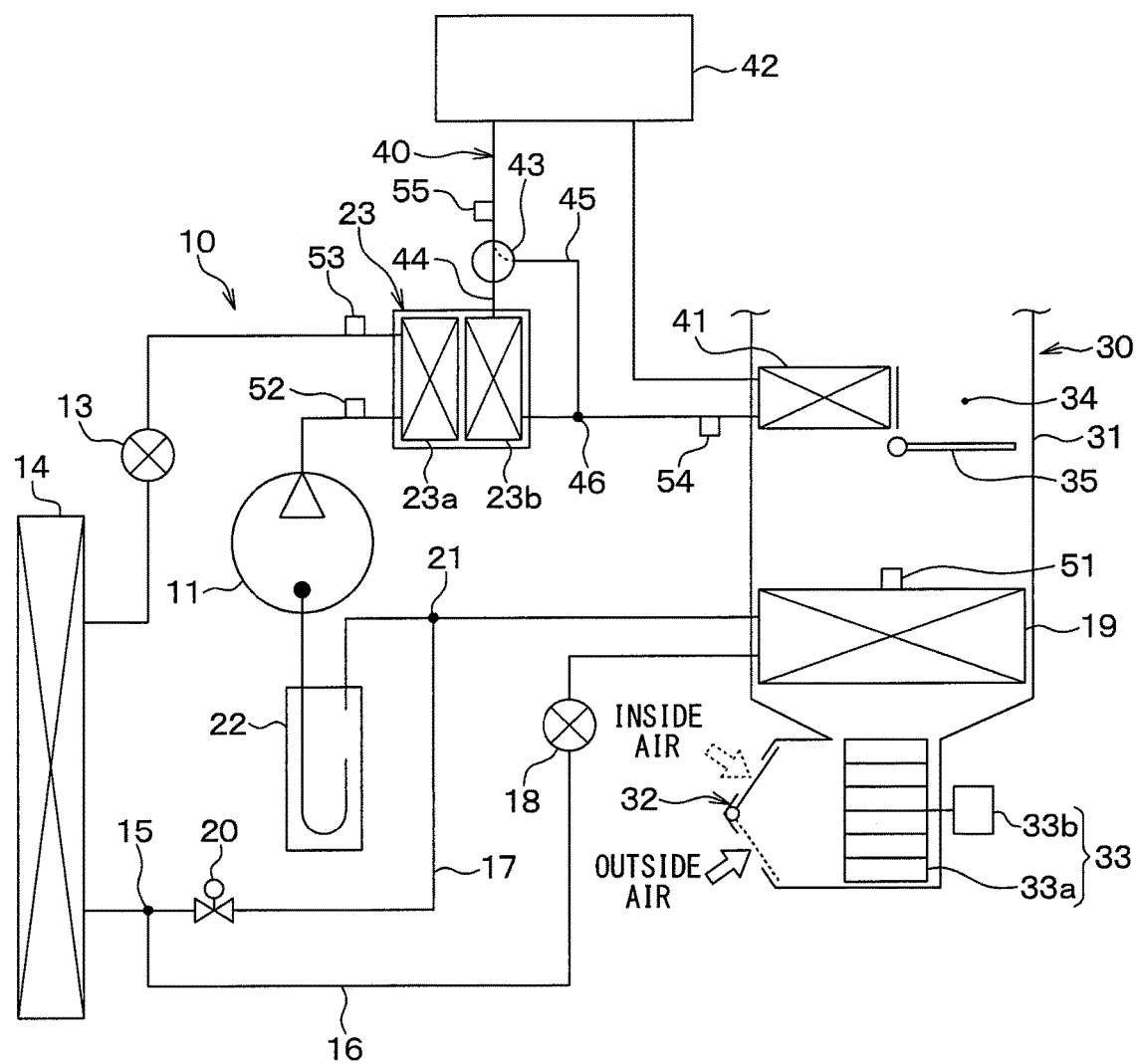
FIG. 25 is a schematic configuration diagram of a vehicle air conditioner according to a fifth embodiment.

As shown in FIG. 25, in the hot-water circuit 40 of this embodiment, a hot-water side switching valve 43 is provided on the side of the coolant outlet of the internal combustion engine 42. The hot-water side switching valve 43 serves as a branch portion between a hot-water side heat exchange passage 44 and the hot-water bypass passage 45. The hot-water side switching valve 43 is a passage switching portion that switches the circulation passage for the coolant flowing out of the internal combustion engine 42 to either of the hot-water side heat exchange passage 44 and the hot-water bypass passage 45.

The hot-water side heat exchange passage 44 is a hot-water passage that guides the coolant flowing out of the side of the internal combustion engine 42 toward the heater core 41 via the coolant-refrigerant heat exchanger 23. The hot-water bypass passage 45 is a hot-water passage that guides the coolant flowing out of the side of the internal combustion engine 42 toward the heater core 41 while bypassing the coolant-refrigerant heat exchanger 23.

A hot-water side merging portion 46 is provided on the coolant outlet side of the coolant-refrigerant heat exchanger 23 so as to merge the hot-water side heat exchange passage 44 and the hot-water bypass passage 45. The hot-water side merging portion 46 is configured of a three-way joint that is of the same type as the low-pressure side merging portion 21.

Figure 26:
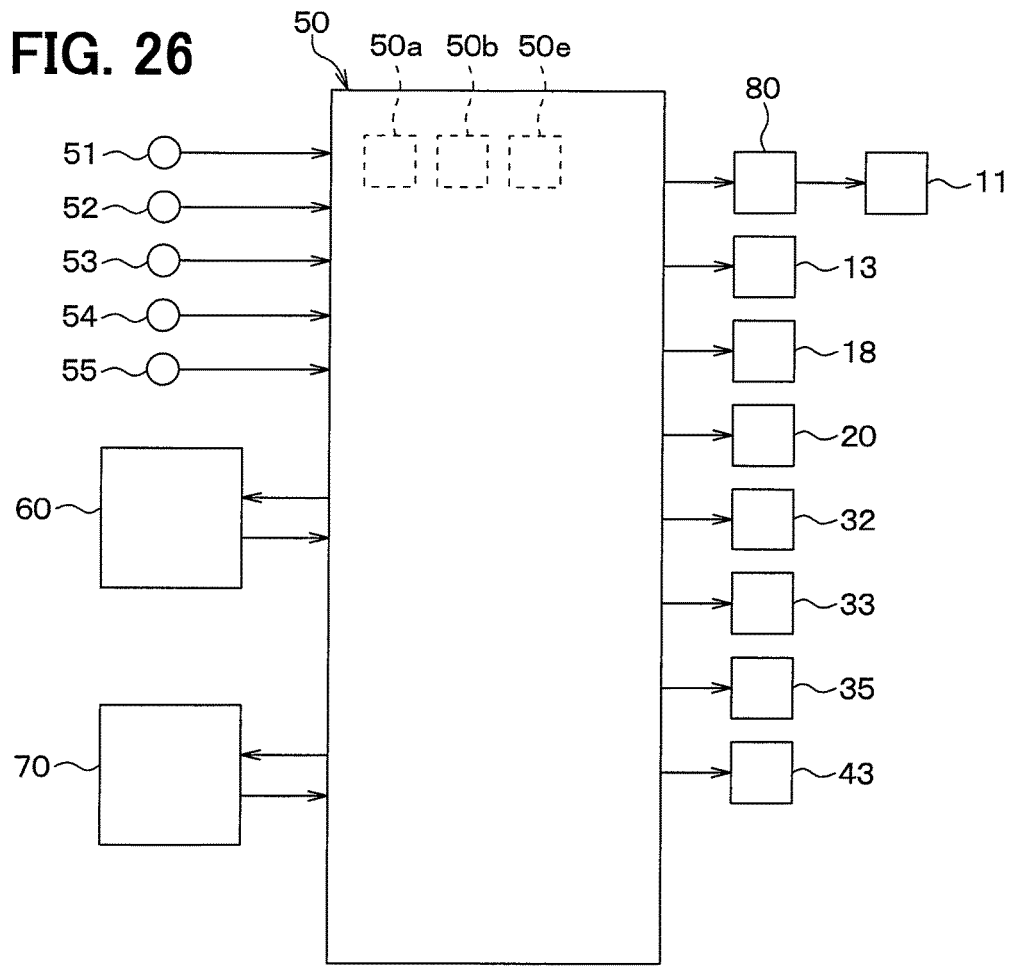
FIG. 26 is a block diagram of an air-conditioning controller of the vehicle air conditioner according to the fifth embodiment.

As shown in FIG. 26, the hot-water side switching valve 43 in this embodiment is connected to the air-conditioning controller 50. The hot-water side switching valve 43 in this embodiment is configured of an electric flow-path switching valve that is controlled by a control signal output from the air-conditioning controller 50.

The hot-water side switching valve 43 in this embodiment is configured to be capable of adjusting the flow rate of the coolant flowing into the coolant-refrigerant heat exchanger 23 by a control signal output from the air-conditioning controller 50. The hot-water side switching valve 43 changes the flow rate of the coolant flowing into the coolant-refrigerant heat exchanger 23, thereby making it possible to adjust the amount of heat exchange between the high-pressure refrigerant and the coolant in the coolant-refrigerant heat exchanger 23. Therefore, in this embodiment, the hot-water side switching valve 43 configures a medium flow-rate adjustment portion that adjusts the flow rate of the coolant flowing into the coolant-refrigerant heat exchanger 23 and thereby as a heat-exchange adjustment portion.

The air-conditioning controller 50 controls the hot-water side switching valve 43 such that the coolant flowing out of the internal combustion engine 42 flows through the hot-water bypass passage 45 in the air-cooling mode or the like of not exchanging heat between the high-pressure refrigerant and the coolant in the coolant-refrigerant heat exchanger 23.

The air-conditioning controller 50 controls the hot-water side switching valve 43 such that the coolant flowing out of the internal combustion engine 42 flows through the coolant-refrigerant heat exchanger 23 via the hot-water side heat exchange passage 44 in the operation mode of exchanging heat between the high-pressure refrigerant and the coolant in the coolant-refrigerant heat exchanger 23.

The control units integrated in the air-conditioning controller 50 of this embodiment include, in addition to the operation-mode switching unit 50a and the compressor control unit 50b, a switching control unit 50e for controlling the hot-water side switching valve 43. In this embodiment, the switching control unit 50e configures a heat-exchange control unit that controls the hot-water side switching valve 43 serving as the heat-exchange adjustment portion.

The structures of other components in this embodiment are the same as those in the second embodiment. In the following, the control processing in the air-heating mode of this embodiment will be described with reference to FIG. 27. The control routine shown in FIG. 27 indicates the processing contents performed when the air-conditioning controller 50 determines the operation mode to be the air-heating mode.

Figure 27:
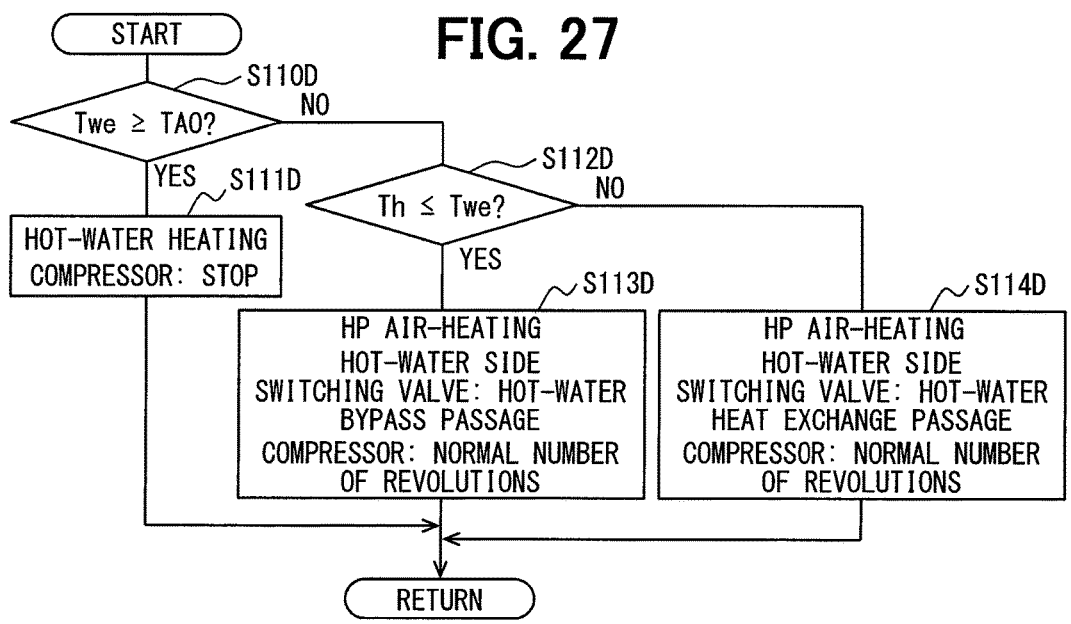
FIG. 27 is a flowchart showing control processing in the air-heating mode, executed by an air-conditioning controller according to the fifth embodiment.

As shown in FIG. 27, first, the air-conditioning controller 50 determines whether or not the coolant temperature Twe detected by the fourth temperature sensor 55 is equal to or higher than the target air outlet temperature TAO (S110D). Consequently, the air-conditioning controller 50 determines the number of revolutions of the compressor 11 to be zero when the coolant temperature Twe is determined to be equal to or higher than the target air outlet temperature TAO. That is, when the vehicle air conditioner satisfies the condition in which the coolant temperature Twe is higher than the target air outlet temperature TAO, the air-conditioning controller 50 stops the operation of the compressor 11 and determines that the hot-water heating is performed to heat the ventilation air using the internal combustion engine 42 as a heat source (S111D).

Meanwhile, the air-heating of the vehicle interior cannot be performed sufficiently in the hot-water heating using the internal combustion engine 42, when the coolant temperature Twe is determined to be lower than the target air outlet temperature TAO. Thus, when the coolant temperature Twe is determined to be lower than the target air outlet temperature TAO, the air-conditioning controller 50 operates the compressor 11 and thereby switches the operation mode to the HP air-heating in which the coolant is heated by the refrigerant circulating through the coolant-refrigerant heat exchanger 23.

This embodiment executes the processing for decreasing the amount of heat exchange between the high-pressure refrigerant and the coolant in the coolant-refrigerant heat exchanger 23, if the vehicle air conditioner satisfies the condition in which the discharge refrigerant temperature Th is equal to or lower than the coolant temperature Twe when switching from the hot-water heating to the HP air-heating.

Specifically, as shown in FIG. 27, the air-conditioning controller 50 determines whether or not the discharge refrigerant temperature Th is equal to or lower than the coolant temperature Twe (S112D). As a result, when the discharge refrigerant temperature Th is determined to be equal to or lower than the coolant temperature Twe, the air-conditioning controller 50 controls the hot-water side switching valve 43 such that the coolant flowing out of the internal combustion engine 42 flows while bypassing the coolant-refrigerant heat exchanger 23 (S113D). At this time, regarding the compressor 11, the number of revolutions of the compressor 11 is determined to be set at the normal number of revolutions such that the high-pressure refrigerant pressure Ph approaches the target pressure Phd.

In this way, the circulation passage for the coolant flowing out of the internal combustion engine 42 is set in the hot-water bypass passage 45, thereby preventing the coolant from flowing into the coolant-refrigerant heat exchanger 23. Thus, the amount of heat absorbed from the ventilation air in the coolant-refrigerant heat exchanger 23 is decreased, thereby making it possible to suppress the decrease in the temperature of the coolant flowing into the heater core 41. As a result, the decrease in the blowing air temperature TAV can be suppressed.

Meanwhile, when the discharge refrigerant temperature Th is determined to exceed the coolant temperature Twe in the determination processing at the step S112D, the high-pressure refrigerant never absorbs heat from the coolant in the coolant-refrigerant heat exchanger 23. Thus, when the discharge refrigerant temperature Th is determined to exceed the coolant temperature Twe in the determination processing at step S112D, the air-conditioning controller 50 controls the hot-water side switching valve 43 such that the coolant flowing out of the internal combustion engine 42 flows to the coolant-refrigerant heat exchanger 23 (S114D). At this time, regarding the compressor 11, the number of revolutions of the compressor 11 is determined to be set at the normal number of revolutions such that the high-pressure refrigerant pressure Ph approaches the target pressure Phd.

The vehicle air conditioner 1 in this embodiment is controlled as mentioned above. Thus, the vehicle air conditioner 1 operates in the HP air-heating as follows.

In the HP air-heating, when the vehicle air conditioner satisfies the condition in which the heater-core blowing temperature Tca is lower than the target air outlet temperature TAO, the air-conditioning controller 50 operates the compressor 11 and thereby switches from the hot-water heating to the HP air-heating.

Figure 28:
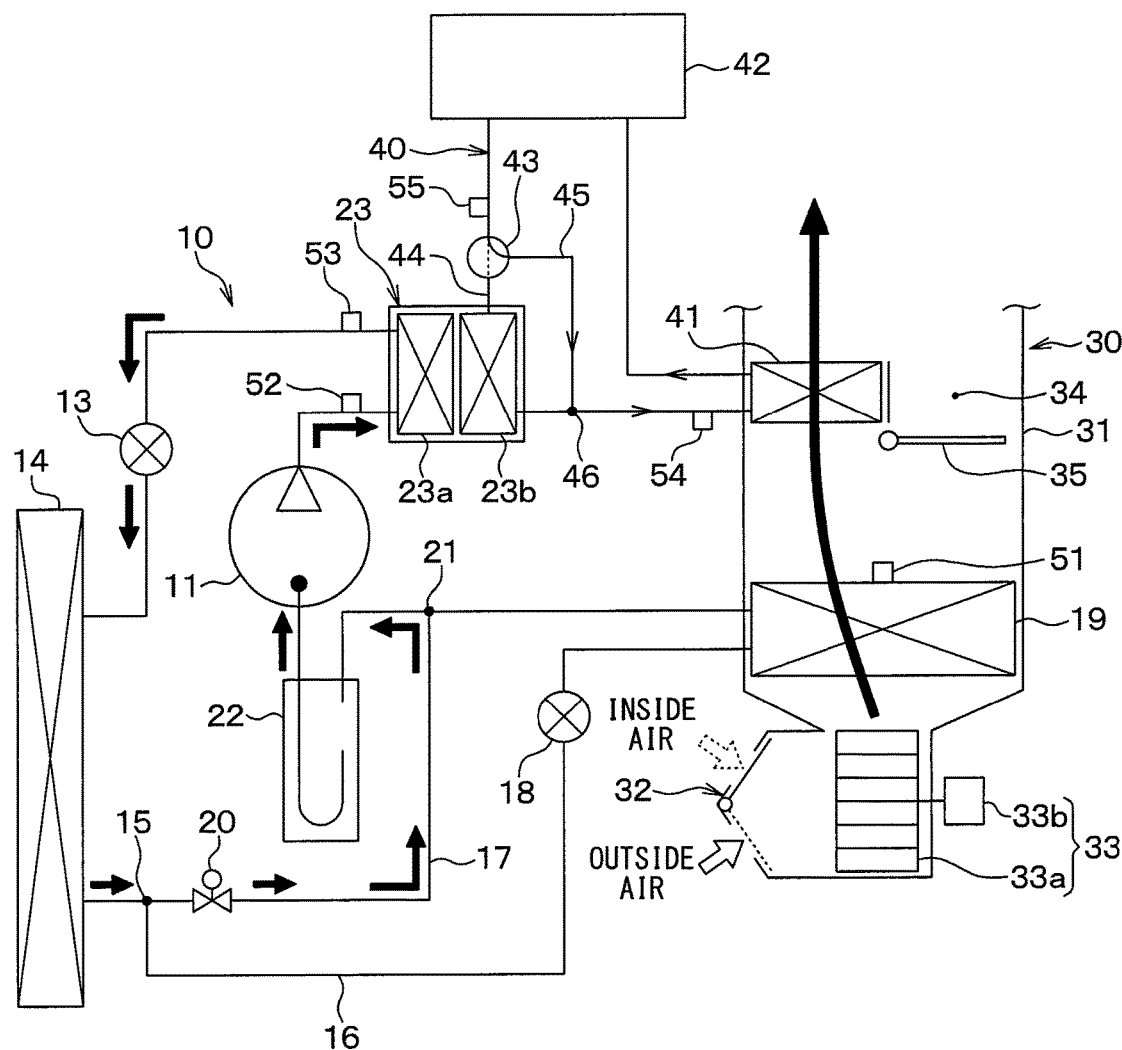
FIG. 28 is an exemplary configuration diagram showing the flow of a coolant when a refrigerant temperature is low in the HP air-heating of the vehicle air conditioner according to the fifth embodiment.

At this time, when the discharge refrigerant temperature Th is equal to or lower than the coolant temperature Twe, the air-conditioning controller 50 sets the circulation passage for the coolant flowing out of the internal combustion engine 42 in the hot-water bypass passage 45. Thus, as indicated by the arrows of FIG. 28, the coolant flowing out of the internal combustion engine 42 flows through the hot-water bypass passage 45 and the heater core 41 in this order, and then flows to the side of the internal combustion engine 42 again.

Figure 29:
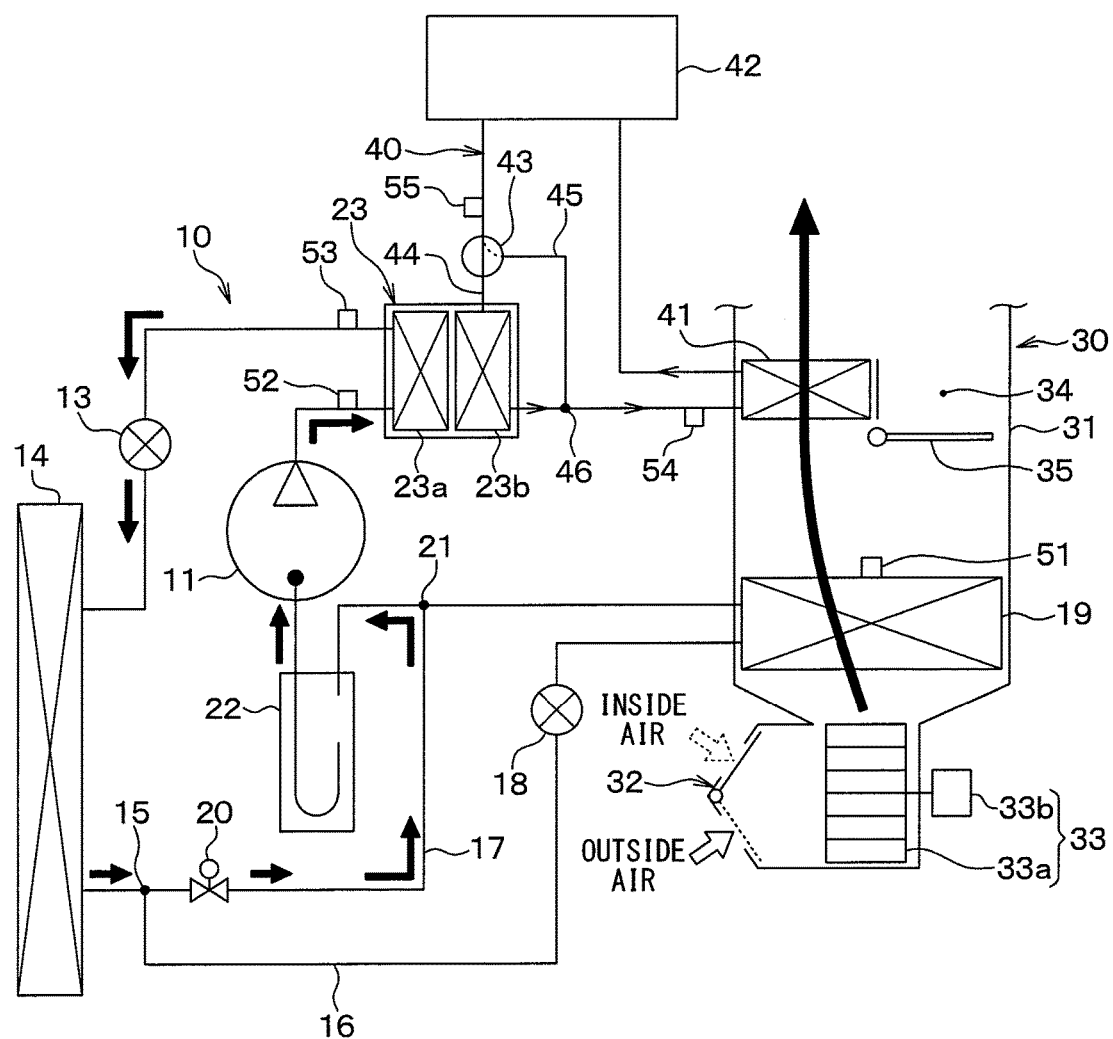
FIG. 29 is an exemplary configuration diagram showing the flow of a refrigerant when a refrigerant temperature is high in the HP air-heating of the vehicle air conditioner according to the fifth embodiment.

Meanwhile, when the discharge refrigerant temperature Th exceeds the coolant temperature Twe, the air-conditioning controller 50 sets the circulation passage for the coolant flowing out of the internal combustion engine 42 in the hot-water side heat exchange passage 44. Thus, as indicated by the arrows of FIG. 29, the coolant flowing out of the internal combustion engine 42 flows through the coolant-refrigerant heat exchanger 23 and the heater core 41 in this order, and then flows to the side of the internal combustion engine 42 again. In this case, the refrigerant flowing into the coolant-refrigerant heat exchanger 23 dissipates its heat into the coolant, so that the temperature of the coolant flowing into the heater core 41 is increased. Consequently, the ventilation air is heated by the heater core 41 such that its temperature approaches the target air outlet temperature TAO.

The vehicle air conditioner 1 of this embodiment, mentioned above, is configured to decrease the amount of heat exchange between the refrigerant and the coolant in the coolant-refrigerant heat exchanger 23 if the vehicle air conditioner satisfies the condition in which the discharge refrigerant temperature Th is equal to or lower than the coolant temperature Twe when performing the HP air-heating.

Accordingly, the high-pressure refrigerant flowing through the coolant-refrigerant heat exchanger 23 can be prevented from absorbing heat from the coolant. Thus, the decrease in the blowing air temperature TAV of the air to be blown into the vehicle interior can be suppressed when switching from the hot-water heating using a heat source other than the heat pump cycle 10 to the HP air-heating using the high-pressure refrigerant in the heat pump cycle 10. Consequently, the comfort for users who use the vehicle air conditioner 1 can be ensured.

In particular, when the vehicle air conditioner satisfies the condition in which the discharge refrigerant temperature Th is equal to or lower than the coolant temperature Twe, this embodiment is configured to cause the coolant to flow while bypassing the coolant-refrigerant heat exchanger 23, thereby preventing the heat exchange between the high-pressure refrigerant and the coolant in the coolant-refrigerant heat exchanger 23. Thus, this embodiment prevents unnecessary heat exchange between the high-pressure refrigerant and the coolant in the coolant-refrigerant heat exchanger 23, thereby making it possible to effectively suppress a decrease in the blowing air temperature TAV.

In this embodiment, the vehicle air conditioner 1 is configured to cause the high-pressure refrigerant to flow through the interior condenser 12, if the discharge refrigerant temperature Th exceeds the coolant temperature Twe when performing the HP air-heating. Thus, the blowing air temperature TAV of the air to be blown into the vehicle interior during the HP air-heating can approach the target air outlet temperature TAO.

This embodiment has explained the example in which the hot-water side switching valve 43 is disposed at the branch portion between the hot-water side heat exchange passage 44 and the hot-water bypass passage 45, but is not limited thereto. For example, the hot-water side switching valve 43 may be disposed at the merging portion between the hot-water side heat exchange passage 44 and the hot-water bypass passage 45.

OTHER EMBODIMENTS

Although the embodiments of the present disclosure have been described above, the present disclosure is not limited to the above-mentioned embodiments. Various modifications and changes can be made thereto, for example, as follows.

(1) Although each of the above-mentioned embodiments has described the example in which the internal combustion engine 42 is used as the heating source for the coolant as a heating medium by way of example, the present disclosure is not limited thereto. For example, a heat generating member, such as an electric heater or a high-voltage battery, may be used as the heating source for the coolant.

(2) Although each of the above-mentioned embodiments has described the example in which the vehicle air conditioner 1 can be switched among the air-heating mode, the air-cooling mode, and the dehumidification heating mode, the present disclosure is not limited thereto. The vehicle air conditioner 1 only needs to be one that is capable of performing air-heating of the vehicle interior and may be configured, for example, as a device dedicated to air-heating of the vehicle interior.

(3) Although each of the above-mentioned embodiments has described the example in which the air conditioner is switched between the hot-water heating and the HP air-heating by comparing the heater-core blowing temperature Tca or the coolant temperature Twe with the target air outlet temperature TAO, the present disclosure is not limited thereto. For example, the switching may be performed between the hot-water heating and the HP air-heating according to a request from a user or an operating state of the engine.

(4) It is obvious that in the above-mentioned embodiments, elements configuring the embodiments are not necessarily essential, particularly unless otherwise specified and except when clearly considered to be essential in principle or the like.

(5) When referring to a specific number about a component of each of the above-mentioned embodiments, including the number, a numerical value, an amount, a range, and the like, the component should not be limited to the specific number, particularly unless otherwise specified and except when obviously limited to the specific number in principle or the like.

(6) When referring to the shape and positional relationship and the like of a component, or the like in the above-mentioned embodiments, the component should not be limited to the shape, positional relationship, or the like unless otherwise specified and except when limited to the specific shape, positional relationship, etc., in principle or the like.

What is claimed is:

1. An air conditioner for a vehicle, capable of performing air-heating of a vehicle interior, the air conditioner comprising:
 a vapor compression refrigeration cycle including a compressor that compresses and discharges a refrigerant, and a condenser that exchanges heat between the high-pressure refrigerant discharged from the compressor and ventilation air to be blown into a space to be air-conditioned;

a heating heat exchanger that heats the ventilation air before passing through the condenser, by using a heat source other than the refrigeration cycle;

an operation mode switching unit configured to switch between a first air-heating mode of stopping an operation of the compressor and heating the ventilation air by the heating heat exchanger and a second air-heating mode of operating the compressor and heating the ventilation air by at least the condenser;

a heat-exchange adjuster configured to adjust an amount of heat exchange between the high-pressure refrigerant and the ventilation air in the condenser; and a heat-exchange controller configured to control the heat-exchange adjuster, wherein when the operation mode switching unit switches from the first air-heating mode to the second air-heating mode, the heat-exchange controller controls the heat-exchange adjuster to decrease the amount of heat exchange between the high-pressure refrigerant and the ventilation air in the condenser if a condition satisfies in which temperature of the refrigerant in the condenser is equal to or lower than a temperature of the ventilation air heated by the heating heat exchanger before passing through the condenser, as compared to a case where the temperature of the refrigerant in the condenser exceeds the temperature of the ventilation air heated by the heating heat exchanger before passing through the condenser.

2. The air conditioner for a vehicle according to claim 1, wherein the heat-exchange adjuster includes a refrigerant flow-rate adjuster configured to adjust a flow rate of the high-pressure refrigerant flowing into the condenser, and the heat-exchange controller controls the refrigerant flow-rate adjuster to decrease the flow rate of the high-pressure refrigerant flowing into the condenser when decreasing the amount of heat exchange between the high-pressure refrigerant and the ventilation air in the condenser.

3. The air conditioner for a vehicle according to claim 2, wherein the refrigeration cycle includes a high-pressure bypass passage that causes the high-pressure refrigerant to flow while bypassing the condenser, and a high-pressure side switching valve that adjusts a ratio of a flow rate of the high-pressure refrigerant flowing to the condenser to a flow rate of the high-pressure refrigerant flowing to the high-pressure bypass passage, and the refrigerant flow-rate adjuster includes the high-pressure bypass passage and the high-pressure side switching valve.

4. The air conditioner for a vehicle according to claim 1, wherein the heat-exchange adjuster includes an air flow-rate adjuster configured to adjust a flow rate of the ventilation air flowing into the condenser, and the heat-exchange controller controls the air flow-rate adjuster to decrease the flow rate of the ventilation air flowing into the condenser when decreasing the amount of heat exchange between the high-pressure refrigerant and the ventilation air in the condenser.

5. The air conditioner for a vehicle according to claim 1, wherein the operation mode switching unit switches from the first air-heating mode to the second air-heating mode, when a condition satisfies in which the temperature of the ventilation air heated by the heating heat exchanger and passing through the condenser is lower than a target blowing temperature of air to be blown into the space to be air-conditioned.

6. An air conditioner for a vehicle, capable of performing air-heating of a vehicle interior, the air conditioner comprising:

a heating heat exchanger that exchanges heat between ventilation air to be blown into a space to be air-conditioned and a heating medium, to heat the ventilation air;

a vapor compression refrigeration cycle including a compressor that compresses and discharges a refrigerant, and a condenser that exchanges heat between the high-pressure refrigerant discharged from the compressor and the heating medium before flowing into the heating heat exchanger;

an operation mode switching unit configured to switch between a first air-heating mode of stopping the compressor and heating the heating medium before flowing into the condenser, by using a heating source other than the refrigeration cycle, and a second air-heating mode of operating the compressor and heating the heating medium by at least the condenser;

a heat-exchange adjuster configured to adjust an amount of heat exchange between the high-pressure refrigerant and the heating medium in the condenser; and a heat-exchange controller configured to control the heat-exchange adjuster, wherein when the operation mode switching unit switches from the first air-heating mode to the second air-heating mode, the heat-exchange controller controls the heat-exchange adjuster to decrease the amount of heat exchange between the high-pressure refrigerant and the heating medium in the condenser if a condition satisfies in which the temperature of the refrigerant in the condenser is equal to or lower than the temperature of the heating medium heated by the heating source and before flowing into the condenser, as compared to a case where a temperature of the refrigerant in the condenser exceeds a temperature of the heating medium heated by the heating source before flowing into the condenser.

7. The air conditioner for a vehicle according to claim 6, wherein the heat-exchange adjuster includes a refrigerant flow-rate adjuster configured to adjust a flow rate of the high-pressure refrigerant flowing into the condenser, and the heat-exchange controller controls the refrigerant flow-rate adjuster to decrease the flow rate of the high-pressure refrigerant flowing into the condenser when decreasing the amount of heat exchange between the high-pressure refrigerant and the heating medium in the condenser.

8. The air conditioner for a vehicle according to claim 6, wherein the heat-exchange adjuster includes a medium flow-rate adjuster configured to adjust a flow rate of the heating medium flowing into the condenser, and the heat-exchange controller controls the medium flow-rate adjuster to decrease the flow rate of the heating medium flowing into the condenser when decreasing the amount of heat exchange between the high-pressure refrigerant and the heating medium.

9. The air conditioner for a vehicle according to claim 6, wherein the operation mode switching unit switches from the first air-heating mode to the second air-heating mode when a condition satisfies in which a temperature of the heating medium heated by the heating source before flowing into the condenser is lower than a target blowing temperature of air to be blown into the space to be air-conditioned.

* * * * *